US008724528B2

(12) United States Patent
Velev et al.

(10) Patent No.: US 8,724,528 B2
(45) Date of Patent: May 13, 2014

(54) INFORMATION EXCHANGE BETWEEN GATEWAYS FOR ROUTE OPTIMIZATION WITH NETWORK-BASED MOBILITY MANAGEMENT

(75) Inventors: Genadi Velev, Langen (DE); Kilian Weniger, Langen (DE); Jun Hirano, Kanagawa (JP); Shinkichi Ikeda, Kanagawa (JP)

(73) Assignee: Optis Wireless Technology, LLC, Plano, TX (US)

( * ) Notice: Subject to any disclaimer, the term of this patent is extended or adjusted under 35 U.S.C. 154(b) by 589 days.

(21) Appl. No.: 12/919,993

(22) PCT Filed: Mar. 2, 2009

(86) PCT No.: PCT/EP2009/001466
§ 371 (c)(1),
(2), (4) Date: Nov. 1, 2010

(87) PCT Pub. No.: WO2009/109349
PCT Pub. Date: Sep. 11, 2009

(65) Prior Publication Data
US 2011/0122815 A1    May 26, 2011

(30) Foreign Application Priority Data
Mar. 3, 2008 (EP) .................................... 08003888
Dec. 17, 2008 (JP) ................................ 2008-321324

(51) Int. Cl.
*H04B 7/00* (2006.01)
(52) U.S. Cl.
USPC ......................................................... 370/310
(58) Field of Classification Search
USPC ................... 370/310, 328, 329, 331; 455/403, 455/422.1, 436, 442
See application file for complete search history.

(56) References Cited

U.S. PATENT DOCUMENTS

| 7,808,961 | B2 * | 10/2010 | Ishii et al. ..................... 370/338 |
| 7,920,523 | B2 * | 4/2011 | Grinshpun et al. ........... 370/331 |
| 8,098,627 | B2 * | 1/2012 | Dutta et al. ................... 370/331 |
| 2006/0221837 | A1 * | 10/2006 | Gardner et al. ............... 370/241 |
| 2007/0019597 | A1 * | 1/2007 | Yun et al. ...................... 370/338 |
| 2007/0147298 | A1 * | 6/2007 | Miao et al. .................... 370/331 |
| 2009/0303962 | A1 * | 12/2009 | Jokikyyny et al. ............ 370/331 |

FOREIGN PATENT DOCUMENTS

| EP | 1 863 253 | 12/2007 |
| JP | 2009-539286 | 11/2009 |

OTHER PUBLICATIONS

International Search Report dated Jun. 29, 2009.
G. Velev, et al., "Interactions between PMIPv6 and MIPv6: Route Optimization Issues," IETF Internet Draft, Feb. 2008, pp. 1-15.

(Continued)

Primary Examiner — Fan Ng
(74) Attorney, Agent, or Firm — Nixon & Vanderhye P.C.

(57) ABSTRACT

The invention relates to a method for informing two access gateways about each other's presence and identity, in order to establish a data path between them, thereby shortening the overall data path of data packets exchanged between two mobile nodes (MN), that are located in different networks. In particular, each access gateway is provided with the other gateway's address and additionally with the other MN's address for forwarding by the access gateway those data packets destined to the other MN to the other access gateway. A combination of Session Initiation Protocol messages (Invite and Ringing) and route optimization messages are used, so as to confer the information on the gateway's ID and MN's address to the gateways.

11 Claims, 11 Drawing Sheets

(56) References Cited

OTHER PUBLICATIONS

A. Dutta, et al., "ProxyMIP Extension for Inter-MAG Route Optimization," IETF Internet Draft, Feb. 2008, pp, 1-25.

D. Johnson, et al., "Mobility Support in IPv6," IETF RFC 3775, Jun. 2004, pp. 1-165.

Japanese Notice of Reasons for Rejection dated Aug. 27, 2013 with English translation.

* cited by examiner

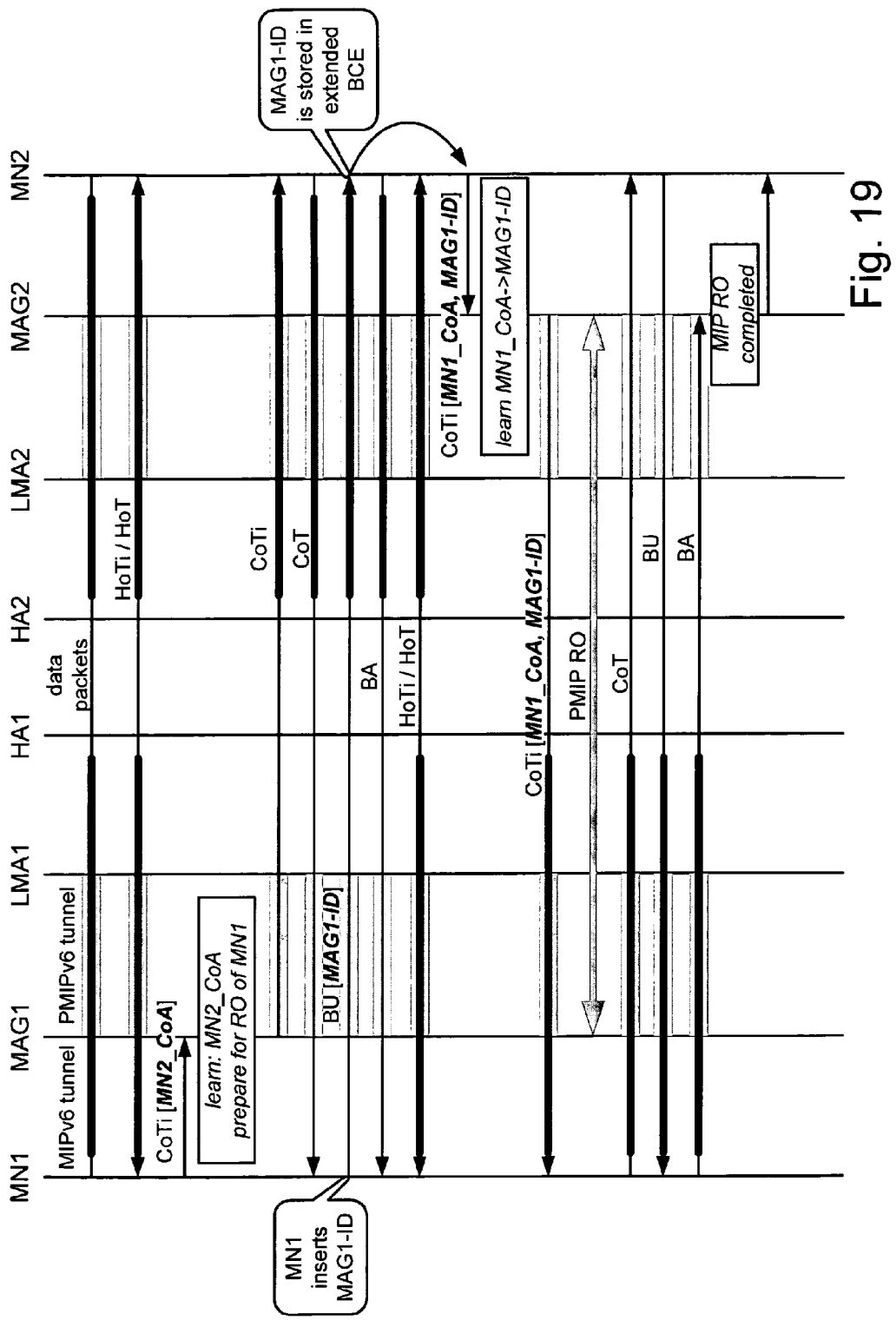

INFORMATION EXCHANGE BETWEEN GATEWAYS FOR ROUTE OPTIMIZATION WITH NETWORK-BASED MOBILITY MANAGEMENT

FIELD OF THE INVENTION

The invention relates to a method for informing access gateways, involved in a communication session between two mobile nodes, about each other presence and ID. Furthermore, the invention relates to a mobile node, an access gateway, a session management server and an administration entity that participates in the invention.

TECHNICAL BACKGROUND

Communications systems evolve more and more towards an Internet Protocol (IP)-based network. They typically consist of many interconnected networks, in which speech and data is transmitted from one terminal to another terminal in pieces, so-called packets. IP packets are routed to the destination by routers in a connection-less manner. Therefore, packets comprise IP header and payload information, whereby the header comprises among other things source and destination IP address.

For scalability reasons, an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

When a terminal powers on, it configures an IP address that is based on the IP address prefix of the access network. If a terminal is mobile, a so-called mobile node (MN), and moves between subnets with different IP prefix addresses, it must change its IP address to a topological correct address due to the hierarchical addressing scheme. However, since connections on higher-layers such as TCP connections are defined with the IP addresses (and ports) of the communicating nodes, the connection to the active IP sessions breaks if one of the nodes changes its IP address, e.g. due to movement.

Mobile IPv6 (MIPv6)

Mobile IPv6—also denoted MIPv6— (see D. Johnson, C. Perkins, J. Arkko, "Mobility Support in IPv6", IETF RFC 3775, June 2004, available at http://www.ietf.org and incorporated herein by reference) is an IP-based mobility protocol that enables mobile nodes to move between subnets in a manner transparent for higher layers and applications, i.e. without breaking higher-layer connections. That is, the mobile nodes remain reachable while moving around in the IPv6 internet network. The main principle of MIPv6 is that a mobile node is always identified by its Home Address (HoA), regardless of its topological location in the internet, while a Care-of Address (CoA) of the mobile node provides information about the current topological location of the mobile node.

In more detail, a mobile node has two IP addresses configured: a Care-of Address and a Home Address. The mobile node's higher layers use the Home Address for communication with the communication partner (destination terminal), from now on called Correspondent Node (CN). This address does not change and serves the purpose of identification of the mobile node. Topologically, it belongs to the Home Network (HN) of the mobile node. In contrast, the Care-of Address changes on every movement resulting in a subnet change and is used as the locator for the routing infrastructure. Topologically, it belongs to the network the mobile node is currently visiting. One out of a set of Home Agents (HA) located on the home link maintains a mapping of the mobile node's Care-of Address to mobile node's Home Address and redirects incoming traffic for the mobile node to its current location. Reasons for deploying a set of home agents instead of a single home agent may be redundancy and load balancing.

Mobile IPv6 currently defines two modes of operation: bi-directional tunneling (FIG. 1) and route optimization (FIG. 2). Using bi-directional tunneling, data packets sent by the correspondent node 101 and addressed to the home address of the mobile node 102 are intercepted by the home agent 111 in the home network 110 and tunneled to the Care-of Address of the mobile node 102, which is anchored at the foreign network 120. Data packets sent by the mobile node 102 are reverse tunneled to the home agent 111, which decapsulates the packets and sends them to the correspondent node 101. Reverse tunneling means that packets are transmitted by the mobile node via an additional reverse tunnel (to complement the "normal" one) that starts at the mobile node and terminates at the home agent.

For this operation in MIPv6, only the Home Agent 111 is informed about the Care-of Address of the mobile node 102. Therefore, the mobile node sends Binding Update (BU) messages to the Home Agent. These messages are sent over an IPsec security association, and thus are authenticated and integrity protected. In order for the MN to have IPsec association with the HA, the MN needs to perform bootstrapping a-priori. Bootstrapping is the process of obtaining at least the following information: a home address, a home agent address, and a security association with home agent. This information is needed before the MN registers a CoA with the home agent. The process may last several seconds because several round-trip-times between MN and HA are needed.

A drawback is that if the mobile node is far away from the home network and the correspondent node is close to the mobile node, the communication path is unnecessarily long, resulting in inefficient routing and high packet delays.

The route optimization mode (see FIG. 2) can prevent the inefficiency of the bi-directional tunneling mode by utilizing the direct path between correspondent node and mobile node. When using route optimization, the mobile node sends binding update messages to the correspondent node, which then is able to directly send data packets to the mobile node (a type 2 routing header is used to send the packets destined to the mobile node's home address on the direct path to the mobile node's care-of address). Of course, the correspondent node has to implement Mobile IPv6 route optimization support.

More specifically, in order to perform route optimization, the mobile nodes and correspondent nodes exchange signaling messages, being part of the Mobility Header protocol, which is an extension header used by mobile nodes, correspondent nodes and home agents in all messaging related to the creation and management of bindings. With respect to route optimization, 4 message types are specified in the mobility header protocol.

FIG. 3 depicts the signaling flow performed for RO in MIPv6. The protection of Binding Updates sent to correspondent nodes does not require the configuration of security associations or the existence of an authentication infrastructure between the mobile nodes and correspondent nodes. Instead, a method called the Return Routability (RR) Procedure is used to assure that the right mobile node is sending the message.

The Return Routability Procedure enables the correspondent node to obtain some reasonable assurance that the mobile node is in fact addressable at its claimed Care-of Address as well as at its home address. Only with this assurance is the correspondent node able to accept Binding Updates from the mobile node which would then instruct the correspondent node to direct that mobile node's data traffic to its claimed Care-of Address.

This is done by testing whether packets addressed to the two claimed addresses are routed to the mobile node. The mobile node can pass the test only if it is able to supply proof that it received certain data (the "keygen tokens") which the correspondent node sends to those addresses. These data are combined by the mobile node into a binding management key. The integrity and authenticity of the Binding Updates messages to correspondent nodes is protected by using the binding management key.

The MN sends two messages to the CN, each however over a different route. One message—Home Test Init (HoTi) message—is sent to the HA over the MIP IP-in-IP tunnel (not depicted in FIG. 3), which in turn forwards the message to the CN. A mobile node sends a Home Test Init message to the correspondent node (via the home agent) to acquire the home keygen token. As apparent from FIG. 3 the message comprises the home init cookie that the CN must return later, and conveys the home address of the MN to the CN. The other message—Care-of Test Init (CoTi)—is sent directly to the CN in order to obtain the care-of keygen token. The CoTi message informs the CN about the current Care-of Address of the MN, and comprises the care-of-init cookie. If the CN also uses MIPv6, the HoTi and CoTi messages are transmitted via the HA of the CN to the CN.

After receiving the HoTi and CoTi messages, the CN sends two messages back to the MN again over different routes. The Home Test (HoT) message is sent to the MN's HoA, i.e. to the HA, in response to the HoTi message. The HA then forwards the message to the MN over the MIPv6 tunnel. Accordingly, the Care-of Test (CoT) message is sent directly to the MN. Both messages HoT and CoT respectively contain "home keygen token" and "care-of keygen token", respectively along with the home init cookie and the care-of-init cookie received from the previous HoTi and CoTi messages. Both tokens are based on CN's currently active secret key, nonces, and home or care-of address (respectively).

After the HoT and CoT messages arrive at the MN, the MN uses the keygen tokens and generates a binding management key from the tokens received with the HoT and CoT messages. After the mobile node has created the binding management key, it can supply a verifiable Binding Update to the correspondent node. After receiving the Binding Update message, the CN can update its binding cache with the binding of MN's HoA and CoA. The Binding Update message is acknowledged with a Binding Acknowledge message. The exchange of HoTi-HoT and CoTi-CoT messages is used by the CN to verify the HoA-CoA mapping without pre-arranged security association.

Thus, MIPv6 allows to optimize the route between the CN and the MN by allowing a mapping in the CN of the HoA and CoA of the MN, so that the CN can communicate directly with the MN.

Proxy MIPv6 (PMIPv6)

Mobile IP is categorized as host-based (or client-based) mobility management, since the mobility-related signalling is between the host (or client) and the HA. Hence, it is sometimes called Client Mobile IP (CMIP). Another approach, targeting the IP mobility management in limited geographical regions, is managed by the network and therefore is transparent to the MN. This approach is referred as network-based, localized IP mobility.

One main characteristic of network-based mobility is that the access network entities are appropriately configured to detect the MN movement and to exchange information about the current location of the MN, so that the MN does not need to be involved in the mobility process. Therefore, the mobility-related signaling over the wireless interface is avoided. Other advantages of the network-based mobility management are less packet overhead over the air, since no MIPv6 encapsulation is needed, and mobility support for simple IP nodes (i.e., non-MIP-capable nodes). The Internet Engineering Task Force (IETF) organisation is working on such an approach for localized mobility management based on the Mobile IP protocol. Since a network entity is acting as a proxy on behalf of the MN, the protocol is called Proxy Mobile IP (PMIP). There is a variant for IPv6 called PMIPv6 and a variant for IPv4 called PMIPv4. Most of the embodiments of this invention assume PMIPv6 as protocol for network-based mobility management, but the invention is not limited to PMIPv6. It may also be applicable to other network-based mobility management protocols such as PMIPv4.

To provide mobility support to any IPv6 host within a restricted and topologically localized portion of the network and without requiring the participation of the host, proxy mobile IP (PMIP) introduces a new logical entity called Mobile Access Gateway (MAG) which is the proxy mobility agent in the network which manages the mobility related signaling for a mobile node that is attached to its access link. It is the entity responsible for tracking the mobile node's attachment to the link and for signaling the mobile node's local mobility anchor. The MAG is usually co-located with the access router (AR) and performs Mobile IPv6 signaling message on behalf of mobile node, e.g. can send BU messages on behalf of a MN. These BU messages are marked with a flag, so that they can be identified as Proxy BU (PBU) messages. Furthermore, PBU messages may contain a Network Access Identifier (NAI) option, a home prefix option, and a timestamp option. The NAI option contains the NAI, which has the form of "username@realm" and which is used to identify a MN. The home prefix option contains the HoA or home prefix of the MN. In the so-called per-MN-prefix addressing model, every MN has a unique home prefix and the MN's global IP address(es) is configured based on this prefix. The unique home prefix can be used in the PBU messages instead of a HoA. The timestamp option contains the time the PBU has been sent by the MAG and is used by the HA to identify the freshness of the PBU messages. The sequence number value of the PBU message is ignored by the HA.

A Local Mobility Anchor (LMA) is the home agent for the mobile node in the Proxy Mobile IPv6 domain. It is the topological anchor point for the mobile node's home prefix and is the entity that manages the mobile node's reachability state. It is important to understand that the LMA has the functional capabilities of a home agent as defined in Mobile IPv6 base specification and with the additional required capabilities for supporting Proxy Mobile IPv6.

When a MN attaches to a new MAG, it authenticates with the network using the EAP framework and an EAP method such as EAP-AKA. The MAG typically acts as pass-through authenticator and forwards the EAP packets to the AAA server/infrastructure related to the MN. The MN uses a NAI as identifier. If the network authentication is successful, the MAG obtains the MN's profile from the AAA server including the MN's home prefix. The MAG then sends a PBU to the HA and announces the home prefix to the MN. After the MN authenticates with the AR, it starts the IP configuration, i.e. it configures a link-local (LL) IP address, performs Duplicate Address Detection (DAD) for the LL address by sending a Neighbour Solicitation (NS) message to the solicited-node multicast address of the LL address to be checked. If the procedure is successful, the MN sends Router Solicitation (RS) message to all-routers via a corresponding multicast address and waits for receiving a Router Advertisement (RA). The AR/MAG responds with unicast RA including the MN's home prefix.

After configuring a global IP address, the MN is IP reachable and can use the IP address as long as it moves within the PMIP domain. An exemplary signalling flow for PMIPv6 during initial attachment procedure, as described above, is shown in FIG. 4.

FIG. 5 depicts one exemplary scenario, in which two mobile nodes, MN1 and MN2, are located in visited networks (VN) and want to start a communication session between each other. MIPv6 tunnels exist between the mobile nodes MN1/MN2 and their corresponding home agents, HA1/HA2 in the home networks HN1 and HN2. For illustration purposes, the MIPv6 tunnels between MN1 and HA1 and between MN2 and HA2 are omitted from FIG. 5.

In both VNs a PMIPv6 service is offered to the MNs, i.e. the MN1 keeps the same Care-of-Address (CoA) while it moves within the VN1. MN1 is connected to MAG1 and registered at LMA in VN1. Correspondingly, MN2 is connected to MAG2 and registered at LMA2 in VN2. Again, the PMIPv6 tunnels between the MAG1 and LMA1 and between MAG2 and LMA2 are not illustrated in FIG. 5 so as to enhance its overview.

Since the data path between MN1 and MN2 traverses the home networks (solid line in FIG. 5), the end-to-end delay of the data packets is significant. If MN1 performs MIPv6 route optimization, the resulting data path would be the dotted line traversing from LMA1 (in VN1) to HA2 (HN2) and further to LMA2/MAG2 in VN2, since data packets from MN2 are directly transmitted to the MN1's CoA, which is anchored at LMA1. A further optimization would be, if the MN2 also performs MIPv6-RO, which would result in the data path denoted by the dashed line going directly between LMA1 (in VN1) and LMA2 (in VN2), without traversing any of the HNs, HN1 and HN2.

The described scenario can be mapped to the System Architecture Evolution (SAE) work item standardized in 3rd Generation Partnership Project (3GPP). Using SAE terms, the interfaces MN1-HA1 and MN2-HA2 can be described as S2c interfaces.

Another example scenario is depicted in FIG. 6. In this scenario there are no changes regarding MN1. MIPv6 is used to connect MN1 to HA1 in HN1, and PMIPv6 is offered to MN1 in the visited network VN1. However, unlike FIG. 5, MN2 is connected via PMIPv6 from the visited network VN2 to the home network HN2; no MIPv6 is used for MN2. A PMIP tunnel is setup between the MAG2 in VN2 and LMA2 in HN2, which is however omitted for illustration purposes.

Having such a scenario, the PMIPv6 service is offered to the MN2 in both HN2 and VN2, which means that the MN2 keeps the same IP address while moving between HN2 and VN2. The data path without any RO is denoted by solid line. The dashed line shows the data path if MN1 would perform MIPv6 RO. MN2 cannot of course perform an MIPv6 route optimization.

As apparent from FIGS. 5 and 6, the data path between the mobile nodes, MN1 and MN2, is not optimal, even after respective MIPv6 ROs are performed by both MNs. Similar problems are also present in other scenarios, such as when MN2 is stationary, i.e. MN2 has no mobility management service.

SUMMARY OF THE INVENTION

Therefore, in view of the above problems in the state of the art, one object of the invention is to provide a shorter data path between two mobile nodes that are in communication with each other and are attached to different networks via respective access gateways.

A more specific object of the invention is how to provide the access gateways with the necessary information so as to establish a shortened data path between them.

At least one of the above objects is solved by the subject matter of the independent claims. Advantageous embodiments of the invention are subject-matters of the dependent claims.

Instead of using a data path going via the two Home Networks of the mobile nodes, a data path is established which goes via the two Access Gateways, when initiating the session between the nodes. However, in order to do that, the two MAGs need to know about each other, so as to be able to correctly forward the data packets coming from the attached mobile node. In the following, several approaches are described by this invention.

According to one embodiment of the invention, SIP signaling is used at first so as to inform the mobile nodes about the Access Gateways (denoted MAG in the following) to which they are attached. Subsequently, a routing optimization procedure is initiated by each of the two mobile nodes, thereby respectively informing the other mobile node about the Access gateway via which they are attached to the network. For instance, a route optimization of MN1 would provide information about MAG1's ID or IP address to MN2, and vice versa. Furthermore, the MAGs are provided with capabilities to sniff 5 packets coming from the MN so as to learn the other MAG's ID or IP address. For instance, MAG1 is able to sniff packets coming from MN1 for extraction the MAG2's ID from the packets. Advantageously, during the above-mentioned route optimization procedure the location-dependent address (denoted CoA in the following) of the MN, initiating the route optimization, is also provided to the other MN along with the other MAG's ID. Accordingly, the MAG also learns about the other MN's CoA when sniffing the data packets received from the attached MN, having enough information to establish a shortened data path to the other MAG.

According to another embodiment of the invention, SIP signaling is again used, however, this time the MNs are informed about its own Access Gateway and the one of the corresponding MN. That is, MN2 gets to know about MAG1's ID and MAG2's ID, and the other way round. For the MAGs to get the appropriate information, they intercept messages from the MNs containing said information, thereby learning the other MN's access gateway. Advantageously, each MN initiates a route optimization procedure with the other MN, for the MNs to transmit the data packets in the right packet format so that the other MN is able to read the packets. Further advantageously, the MNs are also informed about the Care-of-address of the other MN during the same SIP signaling procedure while setting up the session together with the MAG1's ID and the MAG2's ID. Then, the MAGs when intercepting messages from the MN, would also learn the other MN's CoA. Thus, the MAGs have the necessary information to set up a shorter data path between the MNs.

According to still another embodiment of the invention, SIP signaling is used to inform a respective administration server of the MNs about the necessary information, which in turn forwards said information to the access gateways attaching the MNs. In more detail, during SIP signaling the administration server of the MNs are informed about the other MN's MAG ID/IP address. For instance, the administration server for MN1 comes to know about MAG2's ID, and correspondingly for the one of MN2. Then, the administration servers can transmit appropriate messages to the MAGs informing them about the other MAG's ID. Advantageously, each MN initiates a route optimization procedure with the other MN, for the MNs to transmit the data packets in the right packet format so that the other MN is able to read the packets. Further advantageously, the administration servers are also informed about the location-dependent address of the other MN by the session management servers during the same SIP signaling procedure while setting up the session. In particular, the administration server of MN1 would learn about MAG2's ID and about MN2's location-dependent address from the session management server for MN1. Then, the MAGs would receive from the corresponding administration server the location-dependent address of the other MN together with the other MAG's ID.

According to different aspects, a domain name resolution and reverse domain name resolution procedure are used by different entities, such as by each of the two MNs or the two MAGs, in order to infer the corresponding MAGs ID and IP address. After performing said procedures, the MAG's ID and IP address are used for establishing the data path between the access gateways.

Now referring to one aspect, a first MN infers a domain name associated with the IP prefix of its own address, wherein the domain name belongs to the prefix advertised by the network. Said inferred domain name is then transferred to the second MN, that afterwards transmits a message to the first MN via the second access gateway, so that the second access gateway can intercept said message, comprising the inferred domain name. By intercepting said message, the second access gateway learns about the domain name, and may resolve an IP address belonging to said domain name. The second access gateway then starts a route optimization procedure with the entity belonging to the resolved IP address. The messages for the route optimization procedure are forwarded by said entity to the first access gateway, in case the entity belonging to the resolved IP address isn't already the first access gateway. Upon receiving the messages for the route optimization procedure, the first access gateway responds accordingly to said second access gateway. By forwarding the messages for the route optimization to the first access gateway, the resulting data path is eventually established between the both access gateways, even in case the IP address inferred from the domain name is not associated with the first access gateway.

According to another aspect of the invention, a first MN directly transmits the prefix of its CoA to the second MN, which in turn sends out a message, containing said CoA-prefix, via the second access gateway to which it is attached. The second access gateway then listens to said message for learning the first MN's CoA prefix. Similar to the previous aspect, it is first necessary to infer by the second access gateway a domain name associated with the CoA-prefix before determining the IP address belonging to said domain name, and thus to the entity to which the prefix in the network is anchored. Alternatively, the second access gateway may contact an appropriate server in the network domain corresponding to the CoA-prefix, and request the IP address of the first access gateway. Advantageously, said appropriate server might be an administration server (e.g. an AAA, Authentication, Authorization and Accounting, server).

Again, the second access gateway then starts a route optimization procedure with the entity belonging to the determined IP address. The messages for the route optimization procedure are forwarded by said entity to the first access gateway, in case the entity belonging to the resolved IP address isn't already the first access gateway. Upon receiving the messages for the route optimization procedure, the first access gateway responds accordingly to said second access gateway.

According to still another aspect, the first MN performs a normal route optimization, during which the second MN learns the CoA of the first MN. E.g. when acknowledging the reception of the first MN's CoA as usual, the second access gateway listens to said acknowledgment message and learns the first MN's CoA. Then, as before, a domain name is inferred from the MN's CoA and subsequently an IP address belonging to said domain name is determined. The route optimization procedure is then started by the second access gateway with the determined IP address as destination. This might include the forwarding of the messages for said route optimization by the entity with said determined IP address to the first access gateway.

Alternatively, the second access gateway may request from a server, associated with the first MN CoA's prefix, the IP address of the first access gateway.

According to another aspect, the first and second MNs know the home address of each other. By sending a message, containing the home address of e.g. the first MN, by the second MN, the second access gateway is able to learn the first MN's home address. Then, the second access gateway may contact an appropriate management server corresponding to the IP prefix of the first MN's home address in order to request the address of the first access gateway.

Above, there have been described several ways by which the access gateways can learn the identities and/or addresses of each other in order to be able to establish a shortened data path between them Since both MAGs know each other, they are able to redirect those data packet destined for the other MN directly to the corresponding MAG, as illustrated in FIG. 7.

One embodiment of the invention provides a method for informing a first access gateway, attaching a mobile node to a first network, about the identity of a second access gateway, attaching a correspondent node to a second network. The correspondent node is informed about the identity of the second access gateway, by using messages for a session initiation between the mobile node and the correspondent node. Furthermore, the mobile node is informed about the identity of the second access gateway using messages of a first route optimization procedure initiated by the correspondent node with the mobile node. Then, the first access gateway extracts the identity of the second access gateway from a message, comprising the identity of the second access gateway, transmitted from the mobile node to the correspondent node.

According to an advantageous embodiment of the invention, the mobile node is informed about the identity of the first access gateway, by using messages for the session initiation between the mobile node and the correspondent node. The correspondent node is then informed about the identity of the first access gateway by using messages of a second route optimization procedure initiated by the mobile node with the correspondent node. The second access gateway extracts the identity of the first access gateway from another message, comprising the identity of the first access gateway, transmitted from the correspondent node to the mobile node.

In another embodiment of the invention, the message, comprising the identity of the second access gateway, transmitted from the mobile node to the correspondent node, is part of the second route optimization procedure.

Referring to a mode detailed embodiment of the invention, a data path is established between the first and the second access gateway by routing in the second/first access gateway data packets destined to the mobile/correspondent node to the first/second access gateway using the extracted identities of the first and second access gateway.

The one embodiment of the invention provides a mobile node for exchanging data packets with a correspondent node. The mobile node is attached to a first network by a first access gateway, and the correspondent node is attached to a second network by a second access gateway. A receiver of the mobile node receives messages for a session initiation between the mobile node and the correspondent node, comprising the identity of the first access gateway. A transmitter of the mobile node transmits messages of a first route optimization procedure to the correspondent node, comprising the identity of the first access gateway. The receiver receives messages of a second route optimization procedure from the correspondent node, comprising the identity of the second access gateway. The transmitter further transmits a message, comprising the identity of the second access gateway via the first access gateway to the correspondent node.

The one embodiment of the invention provides an access gateway, that attaches a mobile node to a first network, for establishing a data path to a second access gateway, that attaches a correspondent node to a second network. A receiver of the access gateway intercepts a message from the mobile node destined to the correspondent node, comprising the identity of the second access gateway. A processor of the access gateway extracts the identity of the second access gateway from the received message from the mobile node. The processor further establishes a data path to the second access gateway based on the extracted identity of the second access gateway. A transmitter of the access gateway then forwards data packets, received from the mobile node and destined to the correspondent node, to the second access gateway.

The one embodiment of the invention provides a session management server for establishing a communication session between a mobile node and a correspondent node. The mobile node is attached to a first network by a first access gateway, and the correspondent node is attached to a second network by a second access gateway. A receiver of the session management server receives a session initiation message from the mobile node. A transmitter of the session management server requests the identity of the first access gateway from a server associated with the mobile node. A processor of the session management server inserts the identity of the first access gateway into the session initiation message. The transmitter further forwards the session initiation message towards the correspondent node.

Another embodiment of the invention provides a method for informing a first access gateway, attaching a mobile node to a first network, about the identity of a second access gateway, attaching a correspondent node to a second network. The mobile node is informed about the identity of the first and the second access gateway, by using messages for a session initiation between the mobile node and the correspondent node. The first access gateway extracts the identity of the second access gateway from a message, transmitted from the mobile node to the correspondent node via the first access gateway for a first route optimization procedure initiated by the mobile node.

According to an advantageous embodiment of the invention, the correspondent node is informed about the identity of the first and second access gateway, by using messages for the session initiation between the mobile node and the correspondent node. The second access gateway extracts the identity of the first access gateway from a message, transmitted from the correspondent node to the mobile node via the second access gateway for a second route optimization procedure initiated by the correspondent node.

In another advantageous embodiment of the invention a data path is established between the first and the second access gateway by routing in the second/first access gateway data packets destined to the mobile/correspondent node to the first/second access gateway using the extracted identities of the first and second access gateway.

The another embodiment of the invention further provides a mobile node for exchanging data packets with a correspondent node. The mobile node is attached to a first network by a first access gateway, and the correspondent node is attached to a second network by a second access gateway. A receiver of the mobile node receives messages for a session initiation between the mobile node and the correspondent node, comprising the identity of the first and the second access gateway. A transmitter of the mobile node transmits a message, comprising the identity of the second access gateway via the first access gateway to the correspondent node.

The another embodiment of the invention further provides an access gateway, that attaches a mobile node to a first network, for establishing a data path to a second access gateway, that attaches a correspondent node to a second network. A receiver of the access gateway intercepts a message from the mobile node destined to the correspondent node, comprising the identity of the second access gateway. A processor of the access gateway extracts the identity of the second access gateway from the received message from the mobile node. The processor further establishes a data path to the second access gateway based on the extracted identity of the second access gateway. A transmitter of the access gateway forwards data packets, received from the mobile node and destined to the correspondent node, to the second access gateway.

The another embodiment of the invention provides a session management server for establishing a communication session between a mobile node and a correspondent node. The mobile node is attached to a first network by a first access gateway, and the correspondent node is attached to a second network by a second access gateway. A receiver of the session management server receives a session initiation message from the mobile node. A transmitter of the session management server requests the identity of the first/second access gateway from a server associated with the mobile/correspondent node. A processor of the session management server inserts the identity of the first/second access gateway into the session initiation message. Furthermore, the transmitter forwards the session initiation message towards the correspondent node.

Still another embodiment of the invention provides a method for informing a first access gateway, attaching a mobile node to a first network, about the identity of a second access gateway, attaching a correspondent node to a second network. A first administration server of the mobile node is informed about the identity of the second access gateway by using messages for a session initiation between the mobile node and the correspondent node. Then, the first administration server informs the first access gateway about the identity of the second access gateway.

According to another advantageous embodiment, a second administration server of the correspondent node is informed about the identity of the first access gateway by using messages for the session initiation between the mobile node and the correspondent node. Then, the second administration server informs the second access gateway about the identity of the second access gateway.

The still another embodiment of the invention further provides an access gateway, that attaches a mobile node to a first network, for establishing a data path to a second access gateway, that attaches a correspondent node to a second network. A receiver of the access gateway receives a message from a administration server of the mobile node, comprising the identity of the second access gateway. A processor of the access gateway then extracts the identity of the second access gateway from the received message from the administration server. The processor further establishes a data path to the second access gateway based on the extracted identity of the second access gateway. A transmitter of the access gateway forwards data packets, received from the mobile node and destined to the correspondent node, to the second access gateway.

The still another embodiment of the invention further provides a session management server for establishing a communication session between a mobile node and a correspondent node. The mobile node is attached to a first network by a first access gateway, and the correspondent node is attached to a second network by a second access gateway. A receiver of the session management server receives a session initiation message from the mobile node. A transmitter of the session management server requests the identity of the first access gateway from a administration server of the mobile node. A processor of the session management server inserts the identity of the first access gateway into the session initiation message. The transmitter then forwards the session initiation message, comprising the inserted identity of the first access gateway, towards the correspondent node. The receiver further receives a second initiation message from a second session management server of the correspondent node, comprising the identity of the second access gateway. The transmitter also transmits a message to the administration server, comprising the identity of the second access gateway.

The still another embodiment of the invention provides an administration server for administering a mobile node, attached to a first network by a first access gateway. The mobile node establishes a communication session with a correspondent node, attached to a second network by a second access gateway. A receiver of the administration server receives a message from a session management server of the mobile node, comprising an identity of the second access gateway. Then, a transmitter of the administration server transmits a message to the first access gateway, comprising the identity of the second access gateway.

According to yet another embodiment of the invention, a mobile node obtains the identity of a access gateway which this mobile node is attached to. The mobile node sends a message to inform the other mobile node (correspondent node) about the identity of the access gateway. This message is added to the identity of the other mobile node, and is intercepted by the access gateway of this mobile node. The access gateway of this mobile node learns the identity of the other mobile node by extracting from this message, and starts preparation for the RO procedures between mobile nodes.

BRIEF DESCRIPTION OF THE FIGURES

In the following, the invention is described in more detail with reference to the attached figures and drawings. Similar or corresponding details in the figures are marked with the same reference numerals.

FIG. 19 is a detailed signaling diagram illustrating yet another embodiment of the invention.

DETAILED DESCRIPTION

Definitions

Figure 1:
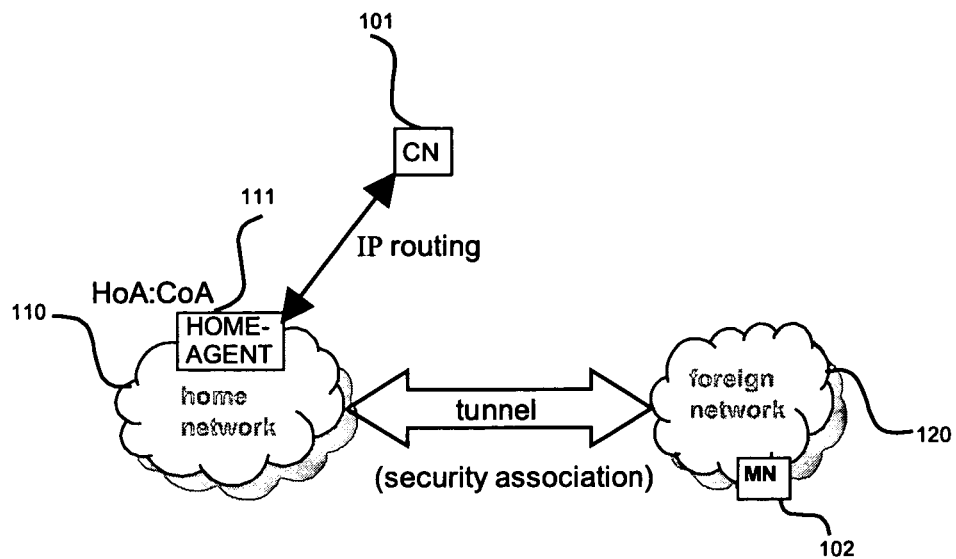
FIG. 1 exemplifies the use of bi-directional tunneling for a communication between a mobile node and a correspondent node according to MIPv6, FIG. 2 exemplifies the use of route optimization for a communication between a mobile node and a correspondent node according to MIPv6.
Figure 2:
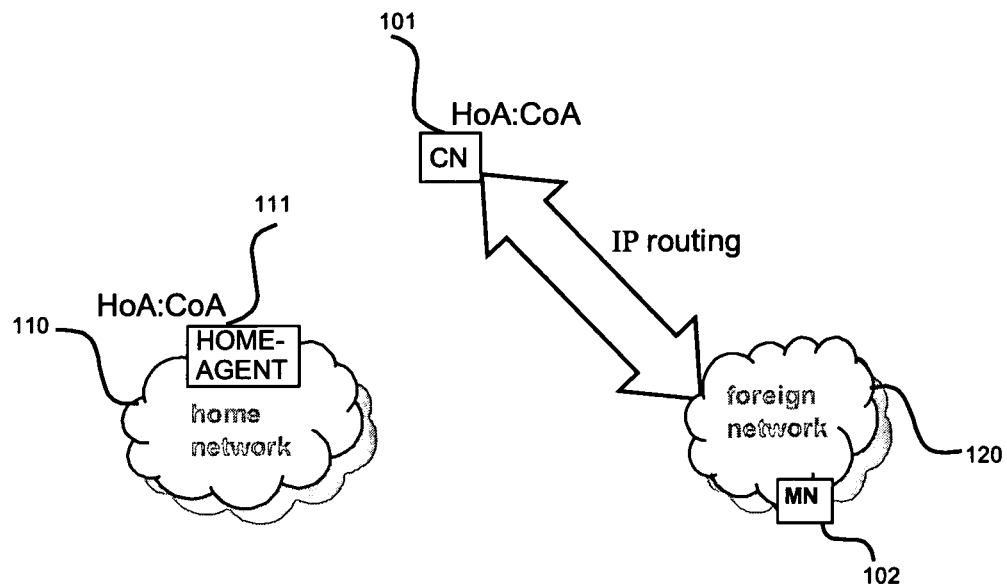
Figure 3:
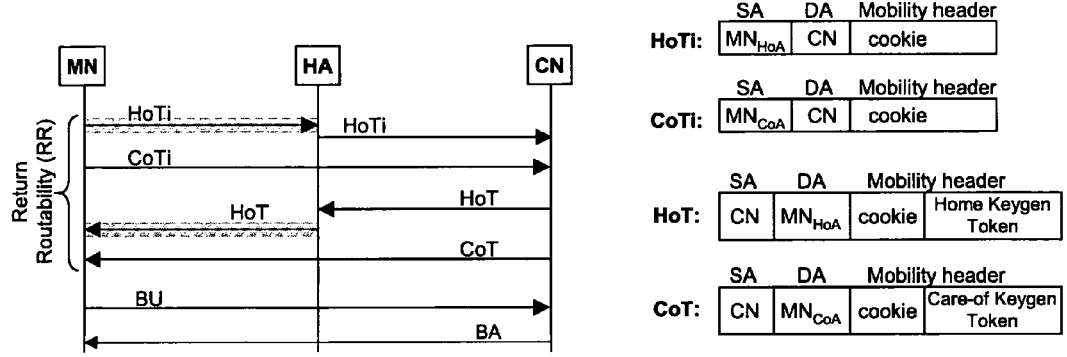
FIG. 3 shows a signal diagram for standard MIPv6 route optimization, along with the packet formats of the relevant messages.

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

A session management server is an entity associated with a MN, which assists the MN in establishing a communication session with another CN. When using the Session Initiation Protocol (SIP) the session management server would be the SIP-registrar or SIP-proxy.

An administration server is an entity associated with a MN, which administers the authentication, authorization and accounting issues connected with the MN. Usually, this tasks are performed by a AAA-server in today's systems.

Throughout this invention the term MAG-ID (identification of the access gateway) is used. One reason to announce the MAG ID to the MN instead of the MAG IP address is that the MNs should not learn the IP addresses of the network entities. This is required by most network operators in order to avoid that end nodes perform Denial of Service (DoS) attacks to the network infrastructure. If the end nodes only know the MAG-ID, but cannot resolve the MAG's IP address, then said requirement is fulfilled. The MAG-ID can be for example the Fully Qualified Domain Name (FQDN) that is the unambiguous domain name specifying the node's position in the Domain Name System (DNS) tree hierarchy. An example of FQDN for MAG1 can be: "mag1.operatorXYZ.com". If the resolution of MAG's FQDN to the corresponding IP address is based on secure DNS, then only authorized entities can contact the DNS servers and resolve the MAG's FQDN into its IP address. Unlike the network entities, like MAG and LMA, the end nodes are usually not authorized to resolve the MAG-ID into its IP address. However, a MAG's IP address could also be used as MAG-ID in case no requirements to the contrary are set by the network operator.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems. Similarly, the following paragraphs will describe various embodiments of the invention. It should be noted that the invention may be advantageously used for example in connection with various mobile communication system such as the 3GPP communication system, but the invention is not limited to its use in this particular exemplary communication network.

Figure 4:
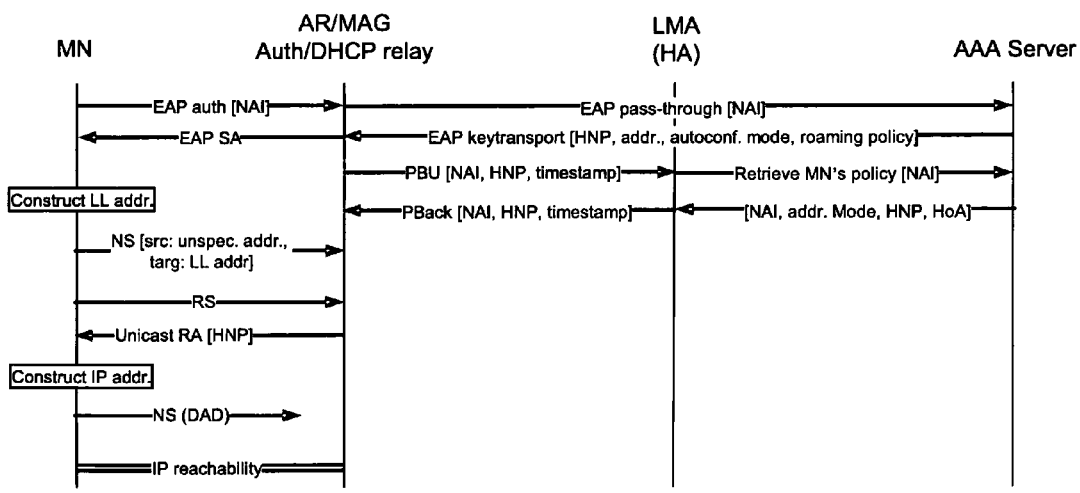
FIG. 4 illustrates a signaling diagram for the initial attach procedure for a MN using PMIPv6, FIG. 5 exemplifies one network scenario in which two mobile nodes are attached to different visited networks via Mobile Access Gateways; the possible data paths between the MNs are illustrated therein, FIG. 6 exemplifies another scenario in which two mobile nodes are attached to different visited networks via Mobile Access Gateways; the second mobile node uses PMIPv6 as mobility management between its Home Network and the visited network.
Figure 5:
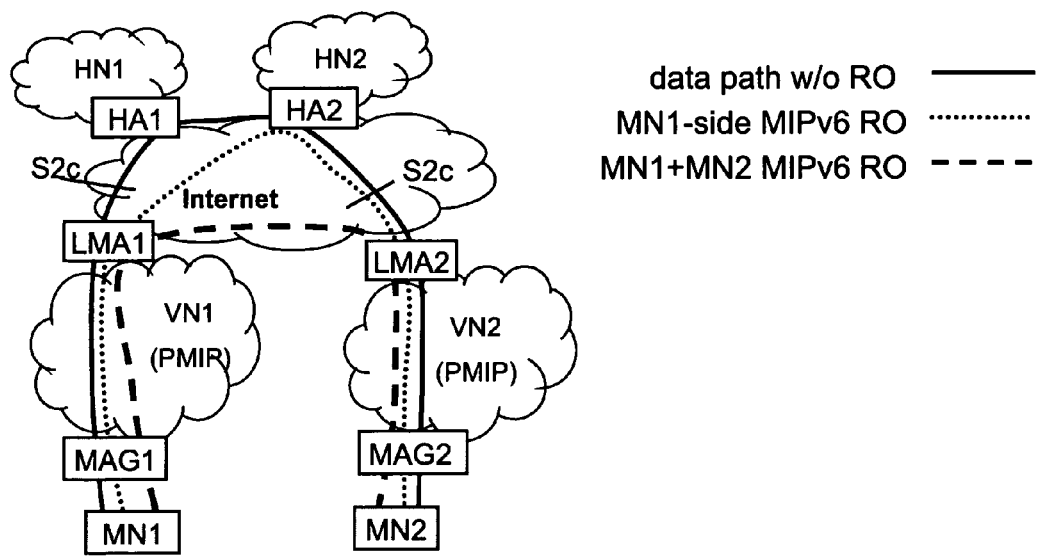
Figure 6:
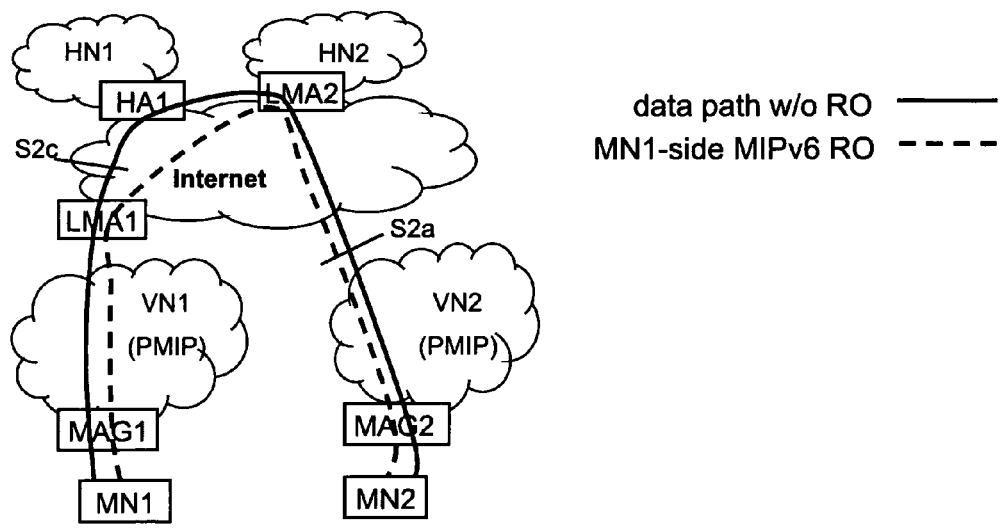
Figure 7:
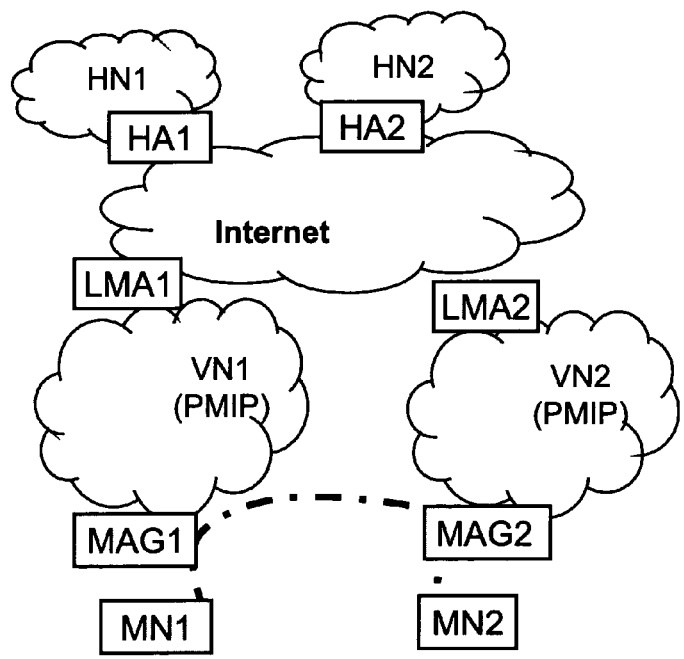
FIG. 7 shows the scenario of FIG. 5, however depicts a shortened data path for the communication session between the MNs, namely going directly via the MAGs.

As apparent from FIGS. 5 and 6, the data paths via the LMAs, LMA1 and LMA2, or via the HAs, HA1 and HA2, are a detour which significantly lengthen the end-to-end delay of the communication between the MNs. FIG. 7 exemplifies a setting which is identical to the scenario presented in FIG. 4, however illustrates a shortened data path which goes from MN1 to MN2 via MAG1 and MAG2, and vice versa.

Figure 8:
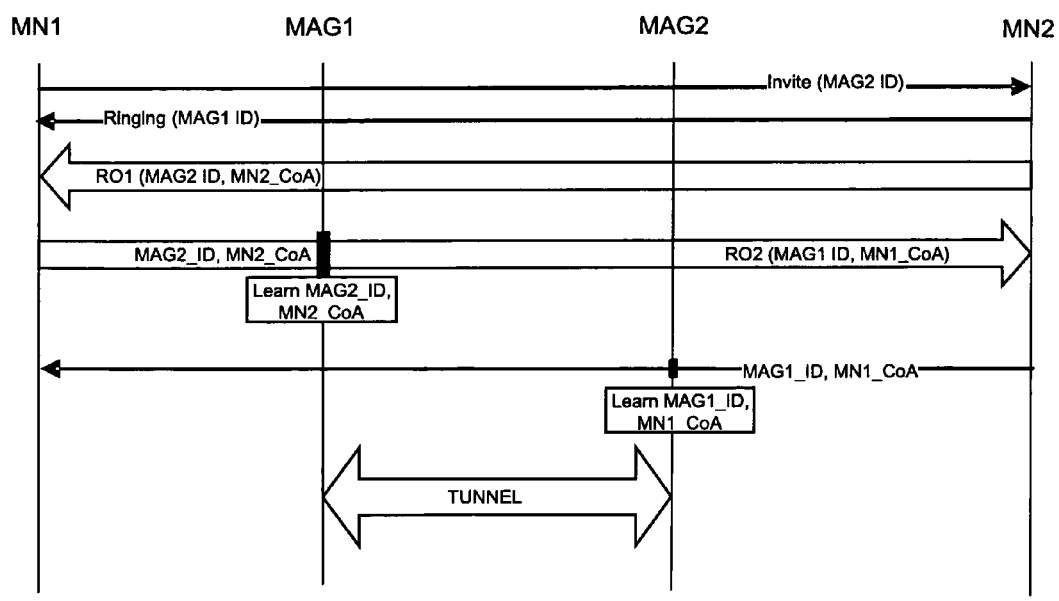
FIG. 8 is a signaling diagram showing one basic embodiment of the invention, for establishing a tunnel between the MAGs.

FIG. 8 illustrates a signaling diagram for a first embodiment of the invention in order to provide the MAGs with appropriate information to achieve such a shortened data path as illustrated in FIG. 7. The first two messages, "Invite" and "Ringing", belong to a session initiation between the two MNs, MN1 and MN2, e.g. based on a session initiation procedure explained later (see SIP signaling caption below). The session is initiated by MN1 in this exemplary scenario by transmitting an "Invite" message to MN2. Though not shown in FIG. 8, dedicated session management servers are provided in the networks so as to assist MNs in establishing a communication session with the other communication partner. Further, said session management servers known about the MAG to which a specific MN is attached. Thus, the MAG2-ID is inserted into the Invite-message by the session management server associated with the MN in VN1 before being received by MN2. In response to the Invite-message, a Ringing-message is transmitted by MN2 back to MN1. Similarly, the MAG1 ID is inserted by a session management server of VN2 into the Ringing-message before MN2 receives said message.

The Invite-message also contains a trigger for the MN2 to start a route optimization procedure with MN1, wherein at least one of the messages of the route optimization procedure is extended so as to further include the MAG2's ID (received with the Invite-message) along with the CoA of MN2. Accordingly, another route optimization is initiated by MN1 with MN2, which provides MN2 with information on MAG1's ID (received with the Ringing-message) and MN1's CoA.

Advantageously, one message of the above-mentioned route-optimization procedure transmitted from MN1 to MN2 is extended by MN1 with MAG2's ID and MN2's CoA. Said message is then intercepted by MAG1, that learns both MAG2's ID and MN2's CoA and forwards said message along towards MN2. Thus, MN2 learns about MAG1's ID and MN1's CoA. In order for MAG1 to learn MAG1's ID and MN1's CoA, MN2 transmits a message to MN1 containing said information. MAG2 only needs to intercept said message for learning the necessary information and then forwards the message to its destination.

Correspondingly, both MAGs, MAG1 and MAG2, posses the necessary identification information about the other MAG and the other MN. Thus, a tunnel between MAG1 and MAG2 can be established in both directions, thus forwarding data packets via the tunnel.

In particular, a routing entry in MAG1 would prompt MAG1 to forward data packets destined to the MN2's CoA directly to MAG2 and from there to MN2. Correspondingly, a routing entry in MAG2 would prompt MAG2 to forward data packets destined to the MN1's CoA directly to MAG1 and from there to MN1.

It should also be noted that a uni-directional tunnel between both MAGs is possible as well. Accordingly, the above-described information exchange is not to be performed fully. Rather, only those steps necessary for informing one of the two MAGs about the other MAG's ID and the other MN's CoA address are to be performed. A skilled person is able to adapt the above information exchange to said end, without additional explicit guidance.

The above described principles by which the tunnel between the MAGs is established, is rather general and ignores various issues that are important for the practical implementation. For instance, the tunnel establishment is not secure. Usually, when redirecting a data path used between MNs, it is necessary to first establish a security association between the two entities, so as to be sure that the re-direction is indeed legitimate. A pre-arranged security association between the MAGs so as to protect the tunnel establishment is possible, but it depends on the network architecture and may not be viable in all cases of the real-world.

According to MIPv6, a Return Routability procedure is performed within the Route Optimization procedure to obtain some reasonable assurance that the mobile node is in fact addressable at its claimed Care-of Address as well as at its home address. Only with this assurance is the correspondent node able to accept Binding Updates from the mobile node which would then instruct the correspondent node to direct the data traffic destined to mobile node to its claimed Care-of Address.

In order to achieve a secure data path between the two MAGs, a route optimization procedure similar to the MIPv6 RO procedure may be performed between the two sides. Accordingly, there can be distinguished three cases:

1. Route optimization is performed between the MN1 and the MAG2. In this case, the RO is initiated by the MN1, and the MAG2 and MN1 are the endpoints of the route optimized data path. For instance, if an MIPv6 RO procedure is used for the route optimization, the MAG2 would perform the role of the MN2 within the MIPv6 RO.
2. Route optimization is performed between the MAG1 and the MN2. In this case, MAG1 initiates the route optimization with the MN2 on behalf of the MN1. The endpoints of the route optimized data path are the MAG1 (instead of MN1) and the MN2. For instance, if an MIPv6 RO procedure is used for the route optimization, the MAG1 performs the role of the MN1 within the MIPv6 RO.
3. Route optimization is performed between the MAG1 and the MAG2. In this case, the MAG1 initiates the route optimization with the MAG2, and a route optimized path between both MAGs is established. For instance, if the MIPv6 RO is used for the route optimization, MAG1 performs the role of the MN1, and MAG2 perform the role of MN2 within the MIPv6 RO.

Other scenarios, similar to the ones of FIGS. 5 and 6, are possible as well. For instance, one of the nodes can be located in the home network and may use the PMIP mobility management. Another example concerns a scenario in which the node is stationary (or no IP mobility service is offered to it) and located anywhere in the Internet. In the case of a stationary node, the route optimization can be performed according to above cases 1 or 2. Nevertheless, should a MAG be available for the MN, the route optimization is preferably performed between the MAGs. Accordingly, the embodiments presented below focus on the above case 3, though a skilled person is knowledgeable to implement the described principles for the other two cases as well.

The embodiments of the present invention are applicable to all of the above cases.

As a result, it is assumed that to establish the tunnel between the two MAGs it would always be necessary to perform a route optimization procedure, similar to MIPv6. Thus, the term PMIP route optimization (RO) in the following refers to the secure establishment of a tunnel between the two MAGs.

Furthermore, it might be necessary to first determine whether it is allowed to establish a tunnel between the MAGs. Said information may be requested from an appropriate server associated with each MN, such as an AAA server of the MN. Or said information is retrieved via the signaling obtained from the MN, which in turn obtained the information from the AAA server. Further, they need to know the related mobile node, for which the route optimization is to be set up.

As already repeatedly mentioned before, one of the problems, encountered when trying to perform a route optimization as described in the above cases, is that the entities performing the route optimization need to know about each other. For instance, in case 3 MAG1 needs to have information on the MAG2, and vice versa, so as to correctly address the messages during the route optimization.

Figure 9:
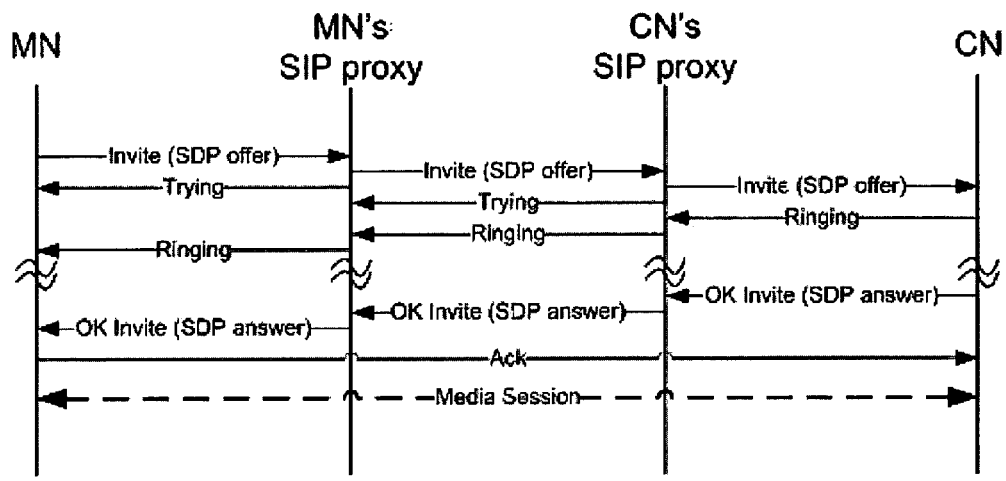
FIG. 9 illustrates a signaling diagram of a SIP procedure for establishing a communication session between MN and CN.
Figure 10:
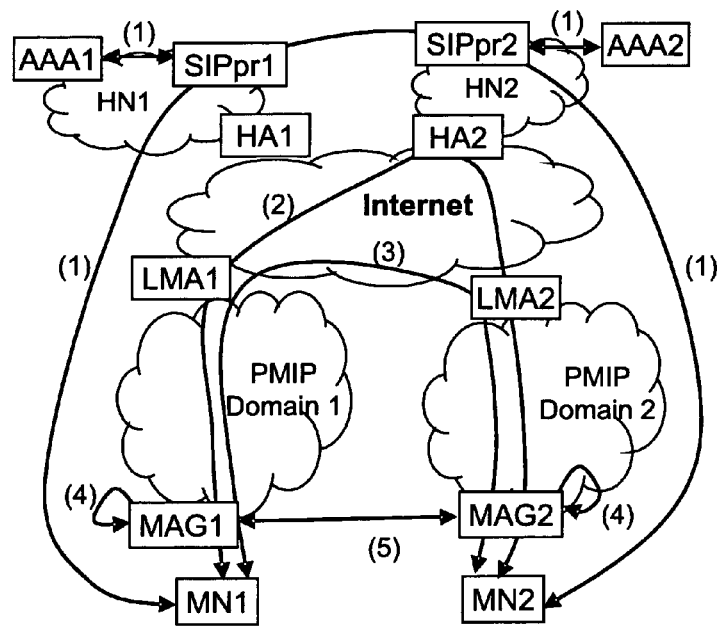
FIG. 10 shows a network scenario, in which the message exchange between the various entities is plotted according to an embodiment of the invention.

The above-described procedure according to FIG. 8 will be illustrated in more detail when considering a specific exemplary scenario as depicted in FIG. 10. However, at first the Session Initiation Protocol, extensively used in various embodiments of the invention, will be presented and briefly discussed with reference to FIG. 9.

Session Initiation Protocol (SIP)

Often, communication session establishment requires signaling on the application layer. A popular protocol that is used for this purpose (e.g., by VoIP applications) is the Session Initiation Protocol (SIP). An example of a session establishment signalling using SIP between a MN and a Correspondent Node (MN2) is shown in FIG. 9. For the sake of clarity, the example shows a simplified signalling flow. If, for instance, IMS (IP Multimedia Subsystem), an architectural framework for delivering IP multimedia to mobile users, is used, more signalling messages are sent, e.g. for resource reservation and charging reasons.

SIP defines new infrastructure entities: each SIP node has assigned a SIP registrar or proxy server, to whom it is registered and to/from whom it usually sends/receives SIP signalling messages. To establish a session with a CN, the MN sends an Invite message to its SIP proxy server. The Invite message contains a description of the session, such as media type, transport protocol, addresses and ports for the session. The Invite message must also contain the SIP Unified Resource Identifier (URI) of the correspondent node. The SIP URI could, e.g., be "Bob@domain.com". The description is usually carried by the Session Description Protocol (SDP). SDP in SIP follows an offeranswer-model, which means that one node offers media type, codecs etc., and the other node accepts or rejects the offer. SDP offers and answers can be appended to various SIP messages.

MN's SIP proxy server discovers the SIP proxy server of the CN by using the SIP URI and DNS and sends the Invite message to the CN's SIP proxy. CN's SIP proxy knows the CN's address from an earlier registration message sent by the CN and forwards the SIP Invite message to the CN. The receipt of this message triggers a notification of the CN's user, e.g., by a ring tone. At the same time, CN sends a notification (Ringing message) back to the MN, which is routed on the reverse path over the two SIP proxy servers. When the CN's user picks up the call, CN sends an OK Invite message (SDP answer) back to the MN, again via the two SIP proxy servers. The SDP answer, which also includes the CN address, can be appended to any of the reply messages, e.g., the Ringing or the Ok Invite message (as is the case according to the example in FIG. 9). Furthermore, the contact field in the SIP header may contain the address of the sender endpoint, being the CN.

Anyway, once the Ok Invite message is received, the addresses of the endpoints are known and the MN can start sending data directly to the CN and vice versa without going over the proxies.

Now referring to the embodiment of the invention in FIG. 10, according to the PMIPv6 specification, the MNs attached to a PMIP domain are unaware about the availability of the PMIP service, i.e. the MNs don't know the presence of the MAG and the LMA. Various embodiments of the invention propose methods, in which the MNs learn the MAG presence via the application layer signalling (e.g. SIP). Within the present invention it is assumed that the AAA servers are aware about the PMIP entities (MAG and LMA) to which the MN is attached. This assumption is based on the PMIPv6 attach procedure as performed in FIG. 4.

The various steps of the embodiment in FIG. 10 are numbered to facilitate its understanding.

(1) The first step describes the complete SIP signaling and is actually composed of various sub-steps as will become apparent from the following. In the beginning, MN1 would like to start e.g. a voice or video call with MN2. MN1 thus initiates SIP signaling and sends a SIP invite message to its SIP server (SIP proxy server in HN1, denoted as SIPpr1). SIPpr1 verifies with the AAA1 server whether the PMIP service is offered to MN1 and whether PMIP RO (establishment of tunnel between both MAGs) is admitted. If the answer of the AAA1 is positive, SIPpr1 includes information about the PMIP RO capability of MN1 into the extended SIP Invite message (e.g. using a special flag). SIPpr1 resolves the MN2's SIP server in HN2 (SIPpr2) and forwards the extended SIP Invite message thereto. At reception of the extended SIP Invite message, SIPpr2 contacts the AAA2 server in HN2 to verify whether MN2 is offered a PMIP service, which is the responsible MAG and whether PMIP-RO is allowed. Since AAA2 knows that PMIP service is offered to MN2 in VN2 and also that MN2 is using MIPv6 to the HN2 and assuming that PMIP RO is admitted for MN2, the AAA2 server tells such information to SIPpr2. Consecutively, SIPpr2 includes MIP/PMIP-related information into the SIP invite message and forwards it to MN2.

The MIP/PMIP-related information may include: 1) trigger for MN2 to perform MIPv6 RO, 2) PMIP RO is admitted and 3) announce MAG2 ID to MN2. MN2 responds to the Invite message with a Ringing message. When the Ringing message arrives at the SIPpr2, SIPpr2 includes the PMIP RO admission information about MN2, so that eventually AAA1 or SIPpr1 know whether PMIP RO is admitted for MN2 in order to know whether to admit PMIP RO to MN1. Next, SIPpr2 forwards the Ringing message to the SIPpr1. SIPpr1 contacts the AAA1 server in HN1 which informs the SIPpr1 about the MAG1 ID, to which the MN1 is attached. SIPpr1 forwards the Ringing message to the MN1 including the following information: 1) trigger to MN1 to perform MIPv6 RO, 2) PMIP RO is admitted and 3) announce MAG1 ID to MN1. The result of this step (1) is that MN1 learns the MAG1's ID and that MN2 learns the MAG2's ID.

(2) In response to the trigger in the Ringing message, MN1 starts the MIPv6 RR procedure with MN2. Alternatively, MN2 might be the first MN to start a MIPv6 RR/RO procedure (since it receives the corresponding trigger first); however, for the rest of the exemplary embodiment of FIG. 10, it is assumed that MN1 starts the MIPv6 RR/RO procedure before MN2 does. After the completion of the MIPv6 RR procedure, MN1 sends an extended BU to MN2 including the MAG1 ID. At reception of the BU message, MN2 learns the MN1 CoA and the MAG1 ID, to which the MN1 is attached. MN2 may store the MAG1 ID in an extended BCE, together with the binding between MN1_HoA and MN1_CoA.

(3) In response to the Invite message, MN2 performs a MIPv6 RO procedure with MN1. Since MN2 has stored the MAG1 ID (see step (2)), MN2 sends to MN1 an extended CoTi message, by advantageously also including the MN1's CoA and the MAG1 ID. Being advantageous for security reasons, MN2 may include the MAG1 ID in the CoTi message, only if the MAG1 ID is received using trusted exchange, e.g. via BU from MN1 according to previous step (2).

(4) Since the CoTi message from MN2 is not MIPv6-tunnelled to HA2 but rather goes via HA1 to MN1, MAG2 may intercept and sniff the CoTi message for learning the relation between MN1's CoA and MAG1. MAG2 may trust this information because MAG2 and MN2 are on the same link, and thus no intruder is present. Said relation is used later for tunnelling the packets destined to MN1's CoA over the PMIP tunnel to MAG1. The same procedure of sniffing CoTi messages is used for the MAG1 to learn the relation between MN2's CoA and MAG2. To said end, MN1 transmits only one special dedicated message, e.g. a CoTi message, containing said information. If MAG1 detects an extended CoTi message containing MN2's CoA and MAG2, MAG1 creates and stores the relation for consecutive PMIP RO tunnelling. The CoTi message is received by MN2, that ignores same, since a successful MIPv6 RO procedure has been performed with the same MN1 shortly before. A timer in the MNs may limit said ignoring process to a reasonable time period after a MIPv6 RO procedure.

(5) After MAG1 or MAG2 detect that the corresponding MN is attached to a MAG, MAG1 and/or MAG2 can start the procedure for establishing a PMIP tunnel to the corresponding MAG. That is, a tunnel is established between MAG1 and MAG2 for the session between MN1 and MN2. The exact procedure of establishing the PMIP tunnel between the two MAGs can vary, and might be an adaptation of the MIPv6 RO procedure, however performed between MAGs instead of MNs. In any case, after the PMIP tunnel is established, the MAGs forward the packets according to a relation between the packet's destination address and the corresponding MAG, such as the relation in MAG2 between MN1's CoA and MAG1.

According to the above-mentioned steps, the MAGs are provided with the necessary information to establish the tunnel. Furthermore, the MNs, by each performing a MIPv6 RO procedure, transmit the data packets in the appropriate format for the corresponding MN to receive and decode same. When the MIPv6 RO procedure is not performed, the data packets transmitted by a MN, are encapsulated and encrypted according to the MIPv6 tunnel between the MN and its HA. In such a case, the corresponding MAG could not determine whether the data packet is destined to CN, since the encapsulation addresses the data packet to the HA, and the inner packets cannot be decoded by the MAG due to its encryption. Likewise, even if the data packets would be redirected to the CN, the CN could not decrypt the inner packets, since the corresponding security association is established between the MN and its HA.

Figure 11:
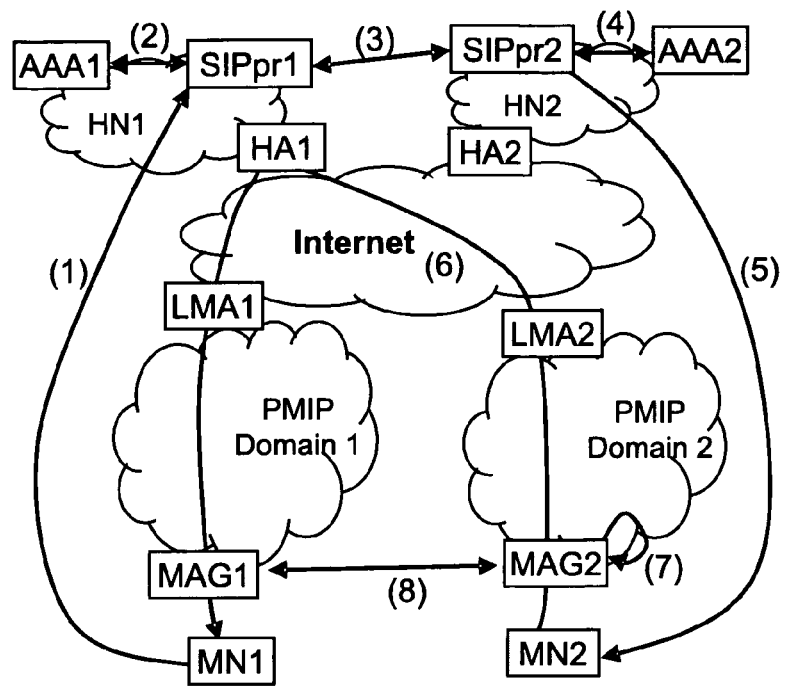
FIG. 11 shows the same network scenario as in FIG. 10, in which the message exchange between the various entities is plotted according to another embodiment of the invention.

Another embodiment of the invention will be illustrated and described with reference to FIG. 11. Unlike the solution shown in FIG. 10, the SIP signalling is used to inform the MN not only about the ID of its own MAG, but also about the corresponding MAG's ID. For example, the SIP Inv message transmitted from SIPpr2 to MN2 is extended to carry (apart from MAG2 ID, trigger for MIPv6 RO and PMIP admittance as with the embodiment according to FIG. 10) additionally the MAG1 ID. Accordingly, the SIP Ring message to MN1 carries (together with MAG1 ID, trigger for MIPv6 RO and PMIP admittance) additionally the MAG2 ID. Thus, the MNs are informed about their own and the correspondent MAG's IDs. The detailed description of the steps in the FIG. 11 is as follows:

(1) MN1 initiates the SIP signalling by sending a SIP invite message to its SIP server (SIPpr1 in HN1). SIPpr1 resolves the MN2's URI enclosed in the SIP invite message and thus discovers SIPpr2 server.

(2) The SIPpr1 verifies with AAA1 server, if the MN1 and MAG1 are admitted for PMIP RO. If they are admitted, SIPpr1 includes the MAG1 ID and MN1 IP addresses (e.g. MN1's CoA), received from the AAA1 server, in the SIP Invite message and forwards the message to SIPpr2. Whether the MN1's IP address (CoA) is available in its AAA server, may depend on the network architecture. A possible way to retrieve the MN1's IP address is to consult the HA, if the MN1 is using MIPv6 (which is assumed in the present scenarios).

(3) SIPpr1 forwards the extended SIP Invite message to SIPpr2, including the MAG1 ID and the MN1's CoA.

(4) SIPpr2 recognizes that PMIP RO related information is included in the SIP invite message and verifies with the AAA2 server whether PMIP service is offered to MN2 and whether PMIP RO is admitted for MN2. If the answer is positive, SIPpr2 knows that it can forward the PMIP RO-related information within the Invite message to MN2, and also holds information on the MAG2's ID.

(5) SIPpr2 forwards the extended SIP Invite message to MN2 including the PMIP RO related information (i.e. MAG1 ID, MAG2 ID, trigger for MIPv6 RO, PMIP admittance info), but additionally the MN1's CoA is included. MN1's CoA is needed because MN2 needs to inform the MAG2 about which node is attached to MAG1, so that MAG2 can establish the relation MN1's CoA→MAG1 ID, as will be explained further below. In this embodiment MN1's CoA is considered as additional PMIP RO-related information.

(6) After receiving the extended SIP Invite message, the MN2 may start performing MIPv6 RO with MN1. MN2 includes in the extended CoTi message the PMIP RO-related information, i.e. MAG1 ID and MN1 CoA received with the SIP invite message. The other messages of the MIPv6 RO procedure, such as HoTi, HoT, CoT, BU and BA, need not be changed according to this embodiment of the invention. MN2 further responds to the extended SIP Invite message with a SIP Ringing message that is forwarded back to the MN1. However, the MN2 response and further SIP signalling is not shown in the figure to enhance its clarity. The Ringing message is transmitted by SIPpr2 and SIPpr1 to MN1. Similar to the previous embodiment, when the Ringing message arrives at SIPpr2, SIPpr2 includes the PMIP RO admission information and forwards it to SIPpr1, including the MAG2 ID and the MAG2's CoA. SIPpr1 contacts the AAA1 server in HN1 which informs the SIPpr1 about the MAG1 ID, to which the MN1 is attached. Thus, the Ringing message received by MN1 comprises the MAG2 ID, MN2's CoA and the MAG1 ID, together with the trigger for MN1 to perform MIPv6 RO. Accordingly, MN1 also starts an MIPv6 RO procedure with MN2, and transmits in said respect an extended CoTi message via MAG1 destined to MN2, comprising the MAG2 ID and MN2's CoA.

(7) Similar to step (4) of the previous embodiment, since the extended CoTi message from MN2 is not MIPv6 tunnelled to HA2 but send directly to MN1's HoA, MAG2 may sniff the CoTi message for learning the relation between MN1's CoA and MAG1. Correspondingly, the extended CoTi message transmitted from MN1 during its MIPv6 RO procedure can be intercepted by MAG1 which extracts the MN2's CoA and the MAG2 ID for learning the relation between them.

(8) MAG2 and MAG1 may start PMIP RO procedures for setting a proxy RO tunnel between them.

Figure 12:
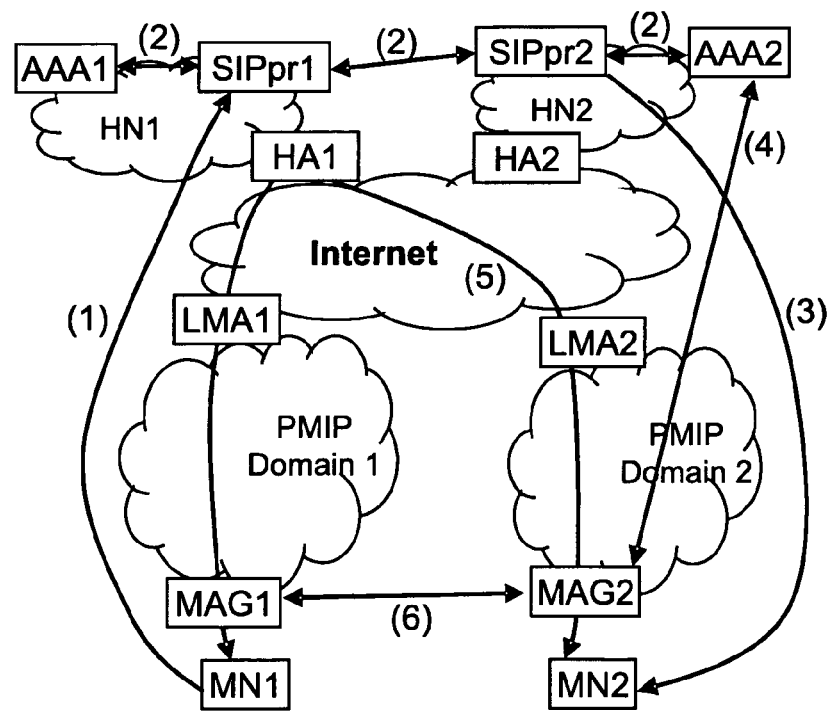
FIG. 12 shows the same network scenario as in FIGS. 10 and 11, in which the message exchange between the various entities is plotted according to a still different embodiment of the invention.

Another embodiment of the invention is illustrated in FIG. 12 and will be explained in detail below. The MAG1 ID is announced to MAG2 via AAA signaling, thus, the main difference of this embodiment to the previous ones in FIGS. 10 and 11 is that the MAGs IDs are no longer carried in the extended MIPv6 RO messages like BU and CoTi. Further, the IP address of the correspondent MN is carried, as the MAG ID, in the messages coming from entities of the AAA infrastructure.

(1) MN1 initiates SIP signalling by sending a SIP invite message to its SIP server (SIPpr1 in HN1). SIPpr1 resolves the enclosed MN2's URI and thereby discovers the SIPpr2 server.

(2) SIPpr1 verifies with the AAA1 server, whether PMIP is offered to MN1 and whether PMIP RO is admitted for MN1. If the answer is positive, AAA1 server transmits the MAG1-ID and MN1's IP address (e.g. CoA when MN1 uses MIPv6, or the PMIPv6's IP address assigned to the MN1 when using PMIPv6) to SIPpr1, because such information needs to be communicated to the MN's network. After obtaining this PMIP RO-related information from AAA1, SIPpr1 includes it in the extended SIP Invite message and forwards the message to SIPpr2. SIPpr2 modifies the extended SIP Invite message into a standard Invite message by extracting the PMIP RO-related information therefrom. Subsequently, SIPpr2 communicates with the AAA2 server and provides same with the extracted PMIP RO-related information for MN1 (e.g. MAG1 ID and MN1's CoA).

(3) SIPpr2 sends to MN2 a SIP Invite message modified to trigger the MIPv6 RO process in MN2.

(4) After the AAA2 server obtains the PMIP RO-related information (e.g. MAG1 and MN1 IP addresses) from SIPpr2, the AAA2 server verifies whether MN2 is attached to a MAG and whether PMIP RO is admitted for MN2. If this is the case, the AAA2 server generates and sends a trigger message to MAG2 informing it about MAG1-ID and MN1's CoA. Based on the trigger message MAG2 learns the relation between MN1_CoA and MAG1.

(5) In response to the trigger in the SIP invite message, MN2 starts the RR procedure to perform MIPv6 RO with MN1.

Also in response to the SIP invite message, MN2 responds to the extended SIP Invite message with a SIP Ringing message that is forwarded back to the MN1. However, the MN2 response and further SIP signalling is again not shown in FIG. 12 to enhance its clarity. The Ringing message is transmitted via SIPpr2 and SIPpr1 to MN1. On the way, SIPpr2 includes the PMIP RO admission information such as the MAG2 ID and MN2's CoA and forwards the Ringing message to the SIPpr1. SIPpr1 extracts said information (MAG2-ID and MN2's CoA) and transmits it to the AAA2 server. The Ringing message is modified by SIPpr1 so as to trigger an MIPv6 RO procedure in MN1, and, thus modified, is transmitted to MN1. Since the AAA1 server knows MAG1 belonging to MN1, a trigger message is transmitted to MAG1 comprising the MAG2-ID and MN2's CoA. Thus, MAG1 learns the relation between MAG2-ID and the MN2's CoA.

(6) Based on the trigger message from the AAA2 server, MAG2 starts a PMIP RO procedure for setting a proxy tunnel to MAG1. Resulting therefrom, MAG2 creates a Binding Cache Entry containing the relation MN1_CoA→MAG1 for forwarding data packets destined to MN1_CoA over the proxy RO tunnel to MAG1. Likewise, in response to the trigger message from the AAA1 server, MAG1 starts another PMIP RO procedure for establishing the tunnel to MAG2. Again, a Binding Cache Entry is thus defined in MAG1 reflecting the relation MN2_CoA→MAG2, for forwarding data packets destined to MN2_CoA over the established tunnel to MAG2.

What has been omitted from the above description as well as from FIG. 12 is that the MNs should each perform the MIPv6 RO procedure as triggered by the SIP invite message (for MN2), respectively the SIP Ringing message (for MN1). In doing so, the data packets are transmitted in the appropriate format so that the communication partner can process the received data packets.

Figure 13:
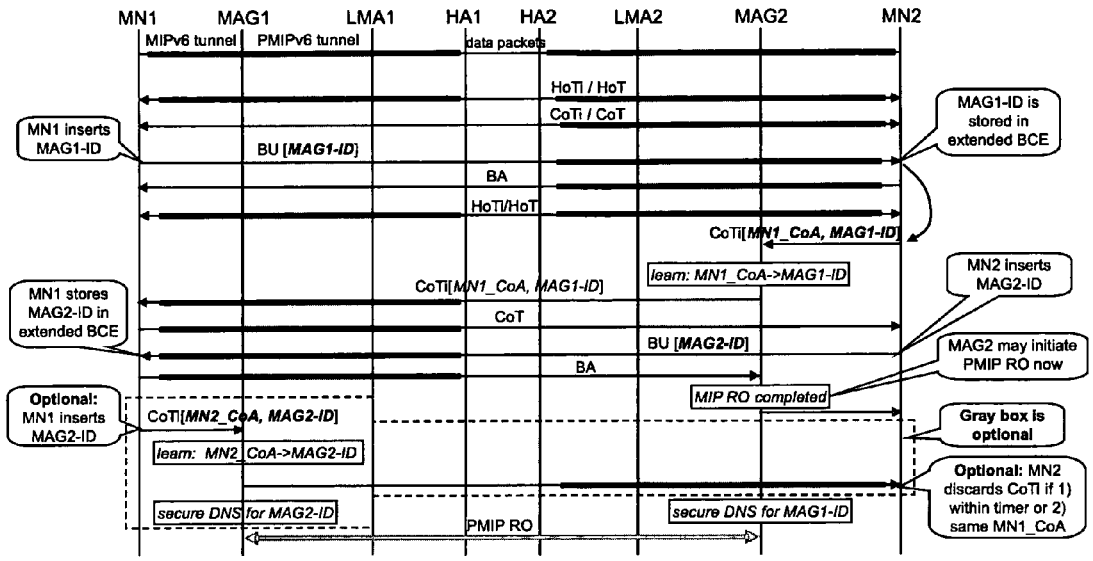
FIG. 13 is a signaling diagram illustrating one embodiment of the invention, similar to the one discussed with reference to FIG. 10.

In order to explain the MIPv6 procedure used within the embodiment illustrated in FIG. 10, a detailed signal diagram is shown in FIG. 13, from which the changes that are needed to the MNs and the MAGs are appreciable as well. The bold black lines between MN1-HA1 and MN2-HA2 denote the MIPv6 tunnel, and the bold gray lines between MAG1-LMA1 and MAG2-LMA2 denote the PMIPv6 tunnel. The text in bold italic font in the BU and CoTi messages denotes new information (that e.g. can be encoded as message options) carried in those messages.

In the beginning, the data packets would be transmitted over the MIP and PMIP tunnels via the Home Networks, as shown in the first row. As already mentioned in connection with FIG. 10, a SIP signaling is performed by which each of the two MNs gets to know the ID of its MAG entity, i.e. MN1 learns MAG1-ID and MN2 learns MAG2-ID (this is not shown in FIG. 13). In response to the corresponding trigger in the received SIP Ringing message, MN1 starts a MIPv6 RO procedure by sending HoTi and CoTi messages to MN2. Since the path of the MN1's HoTi and correspondent HoT reply of MN2 is the same, a bi-directional arrow is shown in the figure. The CoTi message is sent directly to MN2 HoA and therefore directly to HA2, and not to LMA1 and HA1 first. CoT is sent the same way back. After the RR procedure is successful, MN1 sends an extended BU to MN2 including the MAG1 ID learned from the SIP Ringing message. Upon receiving the BU message, MN2 creates an BCE storing the MN1_HoA→MN1_CoA relation and extends the BCE with the MAG1-ID.

When MN2 starts the RR procedure, it sends an extended CoTi message to MN1 including the MAG1 ID, learned from the previously received extended BU message, and the MN1's CoA. MAG2 sniffs the messages sent by MN2 and when it detects an extended CoTi message, it extracts the MN1_CoA→MAG1 relation. Two options are possible afterwards:

1) MAG2 may modify the CoTi by deleting the extensions with the MN1's CoA and MAG1-ID before sending the modified and standard CoTi farther to MN1, or 2) MAG2 does not modify the extended CoTi message, and at reception, MN1 just neglects the extensions.

FIG. 13 depicts the second case, in which the extensions comprising MN1's CoA and MAG1-ID, are still in the extended CoTi message when received at MN1. Upon finishing the MIPv6 RR procedure, MN2 includes in the extended BU to MN1 the MAG2 ID learned from SIP invite, together with the usual MN2's CoA. Similar to the MN2 case, MN1 creates an extended BCE storing the MN2_HoA→MN2_CoA relation and the MAG2-ID.

As soon as the MAG2 learns the relation between MN1's CoA and MAG1-ID, it can start establishing the PMIP RO tunnel to the MAG1. Alternatively, MAG2 cold also start the PMIP RO tunnel establishment when MN1 finishes its MIP RO procedure, as indicated in FIG. 13. Correspondingly, data packets received from MN2 and destined to MN1's CoA are forwarded by MAG2 through said PMIP RO tunnel to MAG1.

The procedure of sending an additional extended CoTi (not part of a RO procedure, but only this one message) from MN1 to MN2 is optional and therefore shaded in gray. The goal of said procedure is to inform MAG1 about the MN2_CoA→MAG2 relation. However, this is only necessary it MN1/MAG1 wants to establish a tunnel to MAG2 to have a sorter data path. In said case, only a uni-directional tunnel from MAG2 to MAG1 is set up.

Alternatively, the information about the MAG2's ID and MN2's CoA, could be conveyed to MAG1 from MAG2 during the PMIP RO process initiated by MAG2 as noted above.

This latter case is not discussed in more detail since a skilled person is able to adapt the corresponding messages without further guidance.

Now referring to the first alternative, MN1 may transmit an extended CoTi message to MN2, comprising MN2's CoA and the MAG2-ID. MAG1 intercepts said extended CoTi message from MN1 and extracts the information pertaining to MN2's CoA and MAG2-ID. Then, MAG1 may forward the CoTi message further to HN2 from where it is then tunnelled to MN2. If MN2 receives a CoTi message shortly after receiving a BU from the same MN1 having the same CoA, MN2 can decide to discard the message and to not answer with a CoT message. The MN2 can act in said way for a predetermined time, controlled e.g. by a timer.

Though not yet mentioned, the MAG-ID itself cannot be used to establish the data tunnel between MAG1 and MAG2. Rather, the MAG's IP addresses are needed. To said end, after the MAG2 and the MAG1 learns the correspondent MAG-IDs, they perform a secure DNS procedure to resolve the IP address of the corresponding MAGs. For instance, MAG1 performs DNS resolution for MAG2's ID and thus determines the MAG2's IP address.

Afterwards, MAG1 may also start to establish the tunnel to MAG2, e.g. by performing a PMIP RO procedure with MAG2. Though the tunnel between the two MAGs can already be established, the data forwarding process begins, however, after the MNs start sending data packets to the correspondent MN CoA, i.e. after the MIPv6 RO procedure.

The tunnel establishment procedure between the MAGs is initiated after MIPv6 RO is completed by MN1 and MN2, according to FIG. 13. However, each of the MAGs can start establishing its own tunnel to the other MAG as soon as it learns the corresponding information (other MN's CoA and other MAG's ID).

Advantageously, the PMIP RO procedure can be designed in such a way that there is no need for both MAGs to know and trust each other prior to the PMIP RO process, similar to the MIPv6 RO procedure in which the MIPv6 RR establishes a security association between the two communication partners.

Figure 14:
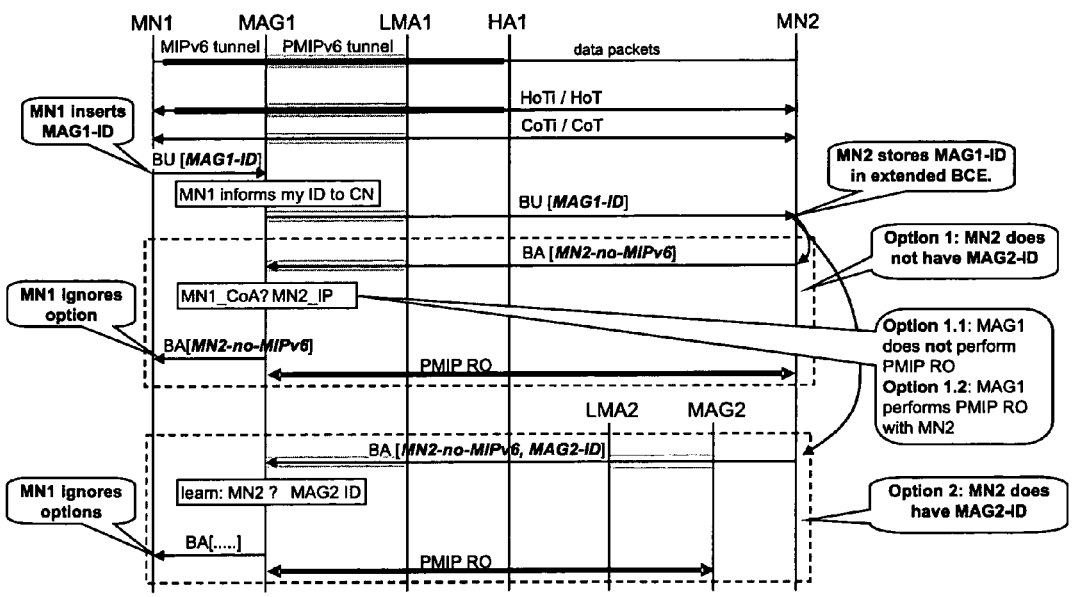
FIG. 14 is a signaling diagram illustrating the signal exchange according to various embodiments of the invention, when having a different network scenario than the one assumed e.g. in FIG. 13.

With reference to FIG. 13 it has been described the signalling diagram according to the embodiment of FIG. 10, in which both mobile nodes are using MIPv6 with their Home Networks. However, in case that just one MN is using MIPv6 and the other MN does not, as with the scenario in FIG. 6, another embodiment of the invention is applied. FIG. 14 shows the detailed flow chart in case MN2 is not using MIPv6. The figure includes 2 sub-cases: in the first one, MN2 is an IP node in the Internet without mobility service, in the second one below, MN2 is using the PMIPv6 mobility service.

The first row shows the data packet tunnelling in case no route optimizations would be performed. Again, the SIP signalling as illustrated before has been omitted from FIG. 14. In summary, the SIP signalling is used to provide the MNs with information about the MAG to which it is attached, i.e. MN2 learns MAG2-ID via the SIP Invite message and MN1 learns MAG1-ID via the SIP Ringing message. MN1 starts MIPv6 RO by exchanging CoTi/CoT and HoTi/HoT messages with MN2. Since MN1 has information about MAG1 ID learned from the SIP invite message, MN1 appends the MAG1 ID to the extended BU transmitted to MN2. After receiving the extended BU message, MN2 creates an extended BCE storing the MN1_HoA→MN1_CoA relation and in addition storing MAG1 ID.

In case MN2 is not using PMIPv6 service (i.e. it is stationary or no mobility management is used), several options are possible:

MN2 sends a standard non-modified BA back to MN1 (not depicted in FIG. 14). In this case, MAG1 does not learn anything from MN2 and no tunnel can be established between MAG1 and MN2, or MN2 sends an extended BA to MN1 including information that the MIPv6 stack for mobile node role is not active (denoted as Option 1 in FIG. 14). MAG1 sniffs BA messages to MN1 and at detection of the extended BA learns that MN2 is not using MIPv6, which means MN2 will not announce a MAG ID because no MAG is present and because MN2 will not send any BUs for MIPv6 RO procedure. From sniffing the BA message, MAG1 learns also the MN2 IP address and may establish a tunnel with MN2.

In case that MN2 is using a PMIP service (see scenario of FIG. 6) and MN2 knows its MAG2 ID (e.g. from SIP signalling), MN2 may want to communicate this information to the correspondent MN1/MAG1. Since MN2 is not using MIPv6, MN2 cannot send this information in the extended BU as described above in connection with FIG. 10. Therefore, MN2 may send instead an extended BA to MN1 including the information about MAG2 ID and additionally information about the unavailability of MIPv6 in MN2. The source address of the BA message denotes the IP address of MN2. Furthermore, in order for MAG2 to learn the relation between MN1's CoA and MAG1-ID, the extended BA message might further include additionally the MAG1-ID, since the MN1's CoA is already included in the destination address field of the BA. The MAG1-ID and MN1's CoA are known in MN2 via the extended BU of the MIPv6 RO procedure initiated by MN1. MAG2 sniffs extended BA messages and in case the MAG2 detects such a message, before the extended BA message is forwarded by MAG2 in direction to MN1, MAG2 extracts the information about MN1's CoA and MAG1-ID. Depending on the implementation, MAG2 could thus start to establish a PMIP tunnel to MAG1, so that data packets received from MN2 at MAG2 and destined to MN1's CoA are forwarded directly to MAG1.

MAG1 can sniff the BA messages to MN1 and when detecting the extended BA to MN1, containing the information about the unavailability of MIPv6 in MN2, MAG1 thus learns the MN2→MAG2 relation. Alternatively, the extended BA message is not sniffed by the MAG1, but another dedicated message is transmitted to the MAG1 in order to inform it about the MN2→MAG2 relation. The dedicated message might be a message from MAG2, which has detected that the BA message does not contain its own identity.

The further processing of the extended BA in MAG1 and MN1 is similar to the processing of an extended CoTi in the MAG described in FIG. 13, i.e. MAG1 may decide to delete the additional PMIP RO-related information in the extended BA message before forwarding a thus-standard BA message to MN1; alternatively, MAG1 may forward the extended BA message without modifying it, and MN1 would ignore the additional PMIP RO-related information. After MAG1 learns the MN2→MAG2 relation, MAG1 establishes a tunnel with MAG1, so as to appropriately forward data packets destined to MN2's IP address to MAG1.

Figure 17:
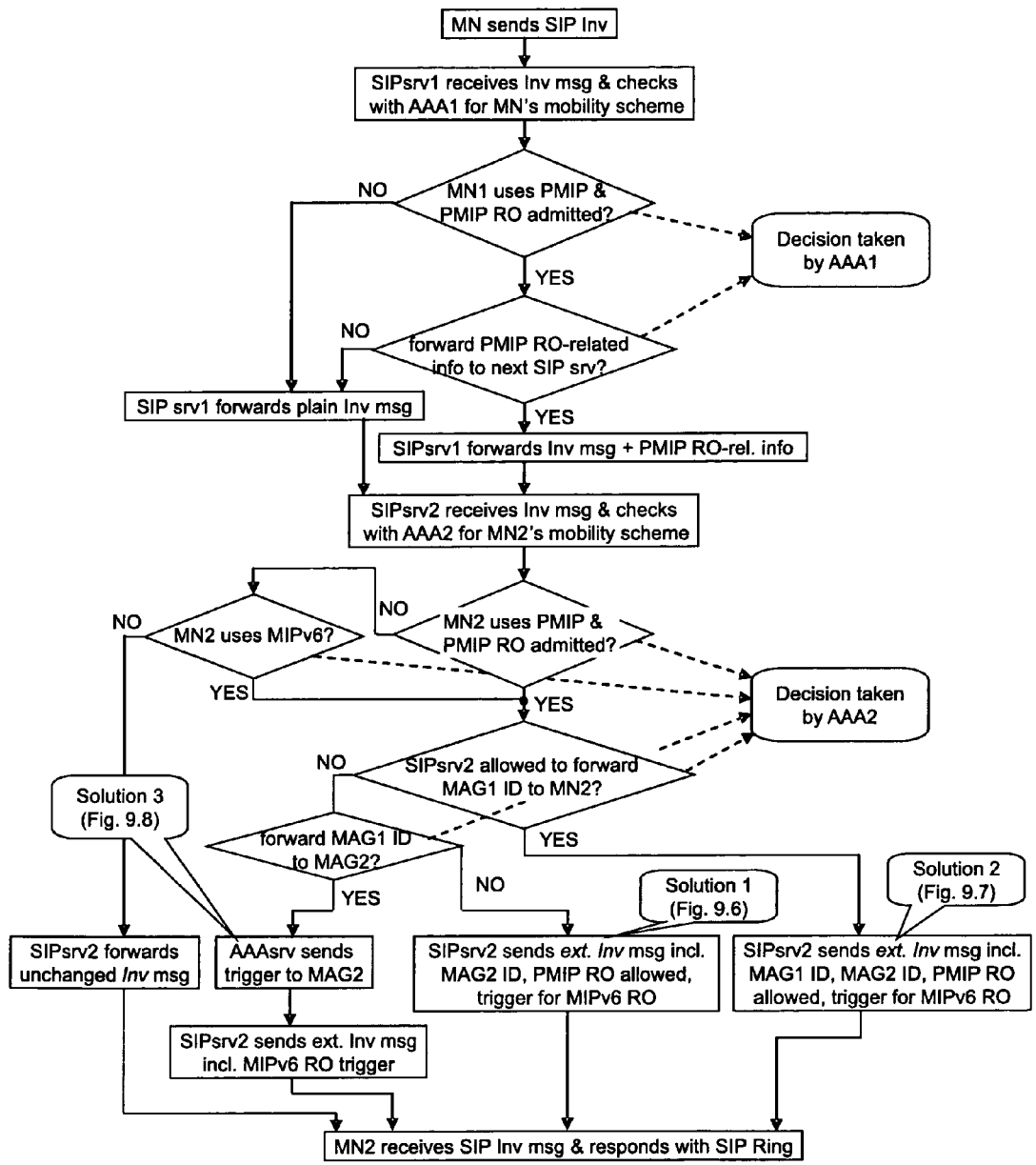
FIG. 17 is a flow chart, illustrating three different embodiments of the invention at the same time.

In order to clarify the correlations between the various embodiments of the invention presented in FIGS. 10, 11 and 12, a flow chart is presented in FIG. 17. The flow chart summarizes the above detailed descriptions for each of the three exemplary embodiments. The flow chart depicts the SIP signalling from MN1 to MN2 together with the logic needed in the SIP servers and AAA servers. The signalling from MN2 to MN1 is not depicted, however, the decisions taken by AAA1 server for the SIP Ring message are similar to the decisions taken by AAA2 server. The flow chart shows that if neither MN1 nor MN2 is using PMIP, or PMIP RO is not admitted, the SIP signalling messages are not modified.

In all three embodiments of the invention as exemplified in FIG. 10-12, the data forwarding through the proxy RO tunnel between the MAGs starts after the MN1 and MN2 have completed their MIPv6 RO procedures and have started transmitting packets to the CoA of the correspondent MN. If MN2 has completed MIPv6 RO and starts sending data packets to MN1's CoA, MAG2 tunnels the packets via the proxy RO tunnel to MAG1. On the other hand, if MN1 has not performed MIPv6 RO, MN1 still sends the data packets to MN2 HoA and therefore, MAG1 is forwarding the packets to LMA1. In order to use the proxy RO tunnel in both directions, both MNs must have performed MIPv6 RO.

Nevertheless, it is also possible to only establish a uni-directional tunnel between the MAGS, be it MAG1→MAG2, or MAG2→MAG1. Accordingly, the skilled person is knowledgeable enough to adapt the above-mentioned principles of the invention so as to achieve such a uni-directional tunnel without further guidance.

Below, different aspects will be described concerning how the MAGs may learn about the presence of each other. In contrast to the previous embodiments of the invention, the further aspects do not involve the application server, i.e. SIP signalling. Accordingly, modified MNs cooperate in order to assist the MAGs in finding each others presence. Several options of these aspects are described as follows. In option 1, MN1 tries to discover the MAG1 ID on its own and signal it to MN2, which signals the information further to MAG2. In Option 2, MN1 announces its IP prefix to MN2 and MN2 forwards the prefix to MAG2. In option 3, MN1 is not modified, but MN2 signals the MN1 CoA to MAG2. The point here is that MAG2 learns the MN1's visited network via MN1's CoA. In option 4, MN1 and MN2 are not modified and MAG2 attempts to discover the MAG1 based on the MN1 HoA (extracted from the unmodified CoTi message sent by MN2). Each of the options is elaborated in detail below:

(Option 1): MN1 performs reverse DNS (Domain Name System) resolution for the IP prefix (e.g. Home Network Prefix, i.e. prefix of VN1) of its CoA. Normally, the reverse DNS (rDNS) resolution is a process to determine the hostname or host associated with a given IP address. In case of MAG ID resolution, the MN does not have the MAG's IP address, but it knows the advertised network prefix (that might be a Home Network Prefix, HNP, in case of PMIPv6 service). Therefore, the MN performs rDNS for the prefix advertised by the network. The DNS system needs to be extended to be able to resolve an FQDN (Fully-Qualified Domain Name) from an IP prefix. The result of the rDNS procedure would be: 1) either LMA1's FQDN (if PMIP is used) or 2) AR/MAG's FQDN (if MIPv6 used) (AR and MAG are co-located).

Figure 15:
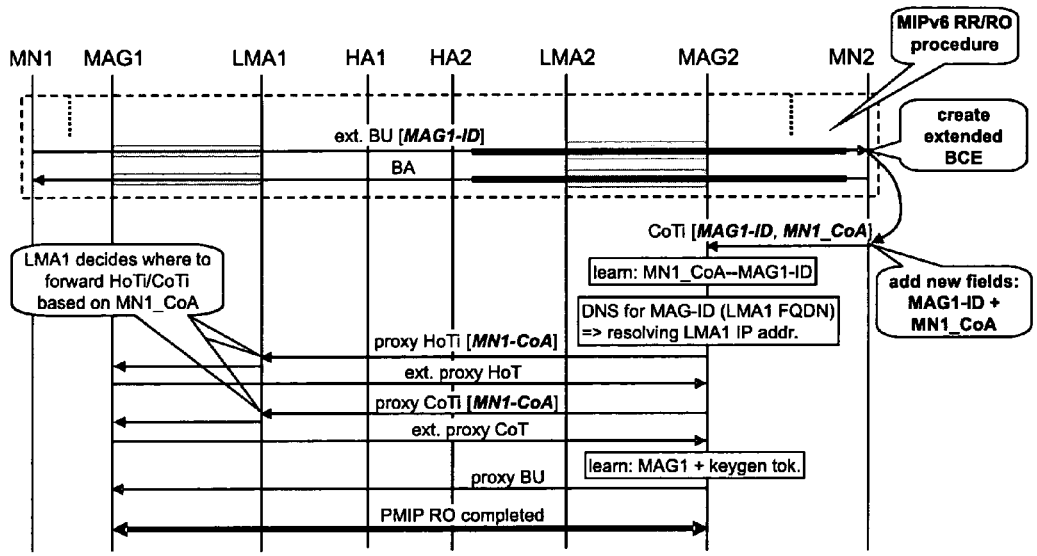
FIG. 15 is a signaling diagram in which a signal exchange is illustrated according to another aspect, based on the use of reverse domain name resolution.

The resolved FQDN is signalled to MN2, as depicted in FIG. 15. This can be achieved for example, by signaling from MN 1 to MN2 the resolved FQDN as MAG-ID in the extended BU, further containing the MN1's CoA. The extended BU would be part of a MIPv6 RO procedure initiated by the MN1 with MN2.

However, alternatively, a new option could be specified in the extended BU message indicating that the transmitted MAG-ID is self-determined, which may mean that this is either an LMA-ID or an AR/MAG-ID. MN2 includes the received ID and the MN1 CoA in the extended CoTi message to MN1. MAG2 intercepts the extended CoTi message and learns the ID signalled by MN1 (actually this is the LMA1 ID) as well as the MN1's CoA. Thus, MAG2 performs secure DNS to resolve the IP address of the learned ID, which in the current example is the LMA1's IP address. Consequently, MAG2 knows the MN1's CoA and the resolved LMA1's IP address.

For the following, it is assumed that in order for MAG2 to establish a tunnel with MAG1, a Proxy MIPv6 RO procedure is performed, similar to a usual MIPv6 RO procedure. Correspondingly, MAG2 may start the proxy RR procedure with LMA1, by transmitting proxy HoTi and proxy CoTi messages, extended with the MN1's CoA, to the resolved LMA1's IP address. It is advantageous to insert the MN1's CoA into the messages for determining the correct MAG, since the proxy HoTi contains only the MAG2 address as source address and the LMA1 address as destination address (and additionally MN2's address), and proxy CoTi contains the MAG2, and the LMA1 addresses (and additionally the MN2's address. The MN2's address is inserted in addition, because of the proxy RR procedure, which means that MAG tells the corresponding entity that it performs the RR procedure on behalf of the MN2. LMA1 can thus forward the messages to the correct MAG (MAG1) since the LMA1 knows the corresponding MAG that is associated with the MN1's CoA, contained in the messages. Then, MAG1 responds back to MAG2 by sending corresponding proxy HoT and CoT messages.

When receiving the proxy CoT message, the MAG2 can determine which is the MAG1 by looking at the source address of said proxy CoT message. The proxy BU message can thus be transmitted directly to MAG1, and the tunnel is established between the two MAGs, MAG1 and MAG2.

Though omitted from FIG. 15, it is necessary for MN2 to also perform a MIPv6 RO procedure, so that the data packets transmitted from MN2 to MN1 are not encrypted and MIP tunnelled to HA2. For instance, the MIPv6 RO procedure for MN2 is performed before the depicted MIPv6 RO procedure initiated by MN1 is executed.

Both end nodes—MN1 and MN2—must be modified in option 1.

(Option 2): If the MN1 does not know the MAG1 ID (usually a MN only knows the link-local IP address and the Layer 2 address, but not the global IP address), it includes the IP prefix, received by MAG1 and used for configuring its CoA, in the BU to MN2 (as MAG-ID or a special new option field), being part of the MIPv6 RO procedure initiated by MN1 with MN2. Similar as before, it is assumed that MN2 also performed a MIPv6 RO procedure with MN1. This option 2 is simpler than option 1 since the MN1 doesn't need to perform rDNS, but rather transmits the MN1's CoA IP prefix to MN2. MN2 stores the obtained MN1 CoA IP prefix in the extended BCE and includes the MN1's CoA IP prefix as MAG1 ID into the single extended CoTi message to MN1. MAG2 intercepts the extended CoTi message and learns the MAG1 ID (actually this is either the MN1's HNP from LMA1 or the normal IP prefix from the AR). Now, the MAG2 has the MN1's CoA IP prefix and must resolve the IP address of the entity that announced that IP prefix. One possibility for MAG2 to resolve the IP address is to perform an rDNS process to find out the FQDN corresponding to that MN1's CoA IP prefix. The further process corresponds to the one in Option 1 above. MAG2 resolves the LMA1 IP address from the FQDN and starts proxy RR with LMA1 (see FIG. 15). Then, the messages are forwarded to the correct MAG1 by LMA1, and thus the tunnel is eventually established between MAG1 and MAG2.

Another possibility for MAG2 to determine MAG1's IP address, would be to contact an AAA server in the network domain corresponding to the IP prefix of MN1's CoA. The AAA server can then tell the MAG1 IP address to MAG2.

Both end nodes—MN1 and MN2—must be modified in option 2.

Figure 16:
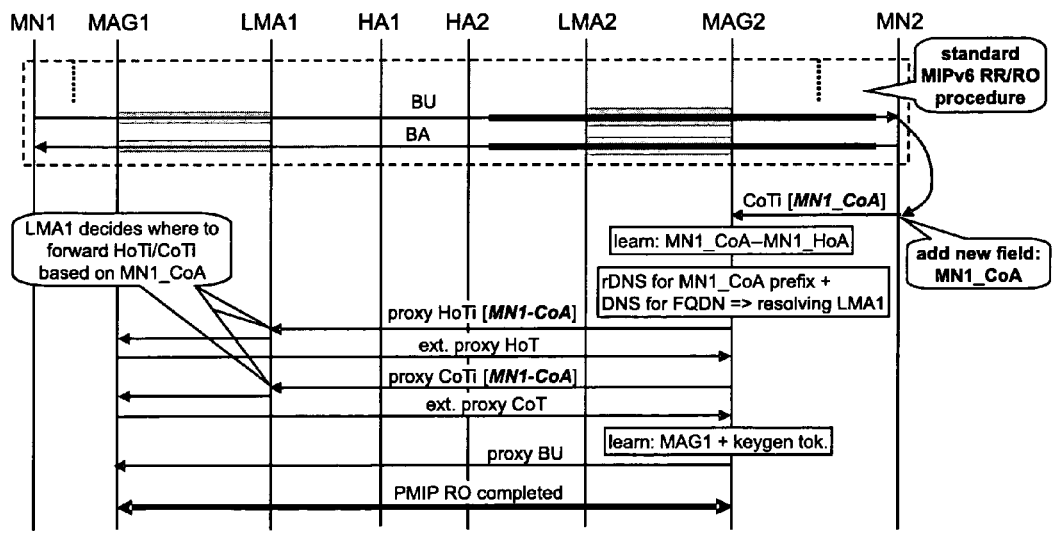
FIG. 16 is a signaling diagram in which a signal exchange for still another aspect is illustrated.

(Option 3): MN1 initiates an MIPv6 RO procedure with MN2 and, after the RR procedure, sends a standard BU to MN2, i.e. no PMIP RO-related information like MAG1 ID is contained in the BU, as illustrated in FIG. 16. Again the MIPv6 RO procedure initiated by MN2 with MN1 is not shown in FIG. 16, however is necessary for MN2 to transmit the data packet of the communication session in the right format, i.e. not encrypted and not tunnelled. There are 2 possibilities how the MAG2 can learn the MN1's CoA.

According to one possibility, MN2 sends a standard-conformant BA message back to MN1, as part of the MIPv6 RO procedure. MAG2 sniffs the BA and thus learns the MN1's CoA from the destination address field of the BA message. In another possibility, after finishing the MIPv6 RO procedure, MN2 includes the MN1's CoA as an option into a single extended CoTi message. MAG2 sniffs the extended CoTi message and thus learns MN1's CoA. After MAG2 has learned the MN1 CoA, MAG2 can extract the IP prefix from the MN1 CoA, and then needs to infer therefrom the MAG1's ID/IP address. To said end, there are again two main alternatives: °MAG2 performs rDNS process to resolve the corresponding FQDN, which is actually the LMA1's FQDN. Once MAG2 has the LMA1's FQDN, MAG2 then resolves the LMA1's IP address by performing a DNS procedure with the LMA1's FQDN. Similar to the previous options 1 and 2, MAG2 then starts proxy RR procedure with LMA1 in order to finally establish a tunnel between MAG2 and MAG1.

Another possible procedure after MAG2 learns the MN1 CoA IP prefix is to discover a AAA server in the MN1's visited network domain corresponding to the IP prefix of MN1's CoA. If MAG2 is allowed to retrieve information from the AAA server in the visited domain, then MAG2 learns MAG1 IP address to which MN1 is attached. Then the tunnel between MAG2 and MAG1 can be established by using the MN1's CoA received during MIPv6 RO and the MAG1's IP address, retrieved from the AAA server.

In option 3 the MN1 is not modified. However, the MN2 may be either modified (in case it sends extended CoTi message including MN1's CoA) or MN2 is not modified (in case MAG2 learns the MN1 CoTi from the unmodified BA message).

(Option 4): MN1 initiates an MIPv6 RO procedure with MN2 and sends, upon finishing the RR part of the MIPv6 RO procedure, a standard BU to MN2, i.e. no PMIP RO-related information like MAG ID is contained in the BU. MN2 sends a standard-conformant BA back to MN1. MN2 performs an MIPv6 RO procedure with MN1 and as part thereof sends a standard conformant CoTi message to MN1. MAG2 sniffs the CoTi message and learns the MN1's HoA (which is the destination address of the CoTi message). MAG2 starts searching for a AAA server in the IP domain corresponding to the IP prefix of the MN1's HoA. If the MAG2 succeeds to find an AAA server, it would be the AAA1 from FIG. 10. Then, MAG2 asks the AAA1 server about the availability of the PMIP service to MN1 and the admittance to perform PMIP RO for MN2. Further, MAG2 can thus learn the MAG1's IP address. MAG2 can then start setting up the proxy RO tunnel to MAG1.

Likewise, MAG1 can also perform a proxy MIPv6 RO procedure to set up the tunnel between MAG1 and MAG2. In particular, during the above MIPv6 RO procedure initiated by MN1, the CoTi message may be sniffed by MAG1 in order to learn MN2's HoA from the destination address field. Similar as with MAG2, MAG1 starts looking for a AAA server corresponding to the IP prefix of the MN2's HoA (AAA2 in FIG.

10). From the AAA2 server, MAG1 learns about the MAG2's IP address and can thus set up the tunnel to same.

Both end nodes—MN1 and MN2—are unmodified in option 4. The whole functionality for MAG1 discovery is implemented in the MAG2 and home AAA server.

From the realization point of view, the easiest options for implementation are 3 (especially those cases where MN2 is not modified) and 4, because the whole procedure is performed by network entities.

In the previous description, it was assumed that the MAG ID is carried in the extended BU or extended BA (in case the MN is not using MIPv6) messages. However, other variants are possible as well. One variant would be to divide the MAG ID in two parts, then carried within the RR messages: one part can be included in the extended HoTi message and another part in the extended CoTi message. The purpose to divide the MAG ID in two parts is to prevent on-path attackers to learn the MAG ID (IP address). After MN2 receives the extended HoTi and extended CoTi messages, MN2 can reconstruct the MAG-ID.

Another variant is based on the assumption that the end hosts are allowed to know the MAGs' IP addresses. Then, the MAG's IP address can be used as MAG-ID. The MNs may use an "alternate Care-of Address" mobility option (alt-CoA) in the BU message to carry the MAG IP address. Alt-CoA option in the BU is needed when the MN cannot use the CoA as source address of the BU. In such cases, the receiver of the BU uses the IP address from the alt-CoA option as CoA for the sending node. For the purpose of this invention, the alt-CoA option can be used in a special way; it carries the proxy CoA, with other words the MAG's IP address. It is possible also to specify a new type of option analogically to the alt-CoA option, that might be called "Proxy CoA" (proxy-CoA) option.

The proxy-CoA may be specified for both BU and BA messages.

To summarize, the embodiments of the invention suggest various changes to the involved entities. The following listing is however only one part of the changes, and is not to be understood as limiting. Rather, a skilled person can infer from the above-discussed examples how to amend the underlying system:

MN should be changed to process extended SIP invite messages. Further, the MN may implement a method to resolve the MAG ID into the MAG's IP address. Additional changes are needed for the processing (sending and reception) of modified MIPv6 RR/RO messages.

MAG should be modified to sniff and process modified CoTi messages and optionally modified BA messages. Further, means for proxy RR and proxy RO procedures can to be implemented too. The MAG may also implement means for resolving the MAG ID into MAG' IP address.

SIP servers should implement means to assist the MNs for discovering the MAG ID, i.e. the SIP servers should be able to communicate with the AAA servers. Further the SIP servers should be able to process (generate, send and receive) modified SIP messages, e.g. SIP Invite and Ring messages.

Optionally, the LMA may be modified in order to forward proxy RR messages coming from a MAG.

Next, yet another different embodiment of the invention will be described. According to the detailed sequence as illustrated in FIG. 13, the PMIP RO tunnel establishment between MAG1 and MAG2 can begin at the time when MAG2 has extracted the relation between MN1_CoA and MAG1-ID from the extended CoTi message, or at the time when MN1 has completed the MIP RO tunnel establishment procedure, etc.

However, in a more general environment, MAGs cannot sufficiently trust each other even if the PMIP RO procedure has been completed between the MAGs successfully. The PMIP RO procedure can be performed even if MAGs do not recognize each other or MAGs do not trust each other. However in the practical system, it is preferable that MAGs trust each other for better security.

Furthermore, even MAGs which have some mutual relation may need to confirm their mutual relation, or indicate to each other what it is a valid (secure) MAG. For instance, if MAGs need to authenticate each entity via each authentication server at each network, or there is a roaming network between MAGs, the MAGs may need to confirm their mutual relation. Various processes, such as setting of a routing path, check and reservation of resources for QoS (Quality of Service) and accounting as well as the above authentication processes, may need to be performed between MAGs.

Thus, it takes some time to establish the PMIP RO tunnel and then finally start communication via an optimized route, because the PMIP RO procedure between MAGs require to send/receive some information from/to the other nodes (which may be located in another network) and perform other various processes.

In the detailed sequence as illustrated in FIG. 13, the optional procedure (shaded in gray in FIG. 13) may assist mutual authentication between MAGs. However, this optional procedure can be performed after MN1 receives the extended BU message from MN2, and then MN1 extracts MAG2-ID from the extended BU message. When the PMIP RO procedures between MAGs begin at this time, the PMIP RO tunnel establishment may be delayed if it takes some time to establish (or confirm) trust relation between MAGs or perform other various processes.

In the optional procedure (shaded in gray in FIG. 13), the process that MN1 retransmits the CoTi message (extended CoTi message) is to allow MN1 to inform MAG1 about the relation between MN2_CoA and MAG2-ID. However, this message is redundant as a CoTi message for optimizing the route. The extended CoTi message transmitted at this time will be discarded or neglected by MN2, so this message does not possess the function as a CoTi message for optimizing the route.

This embodiment is intended to streamline the procedures of the above-mentioned embodiment in order to reduce time to finally establish the PMIP RO tunnel. This embodiment is useful especially when it requires time to establish the PMIP RO tunnel between MAGs.

Figure 18:
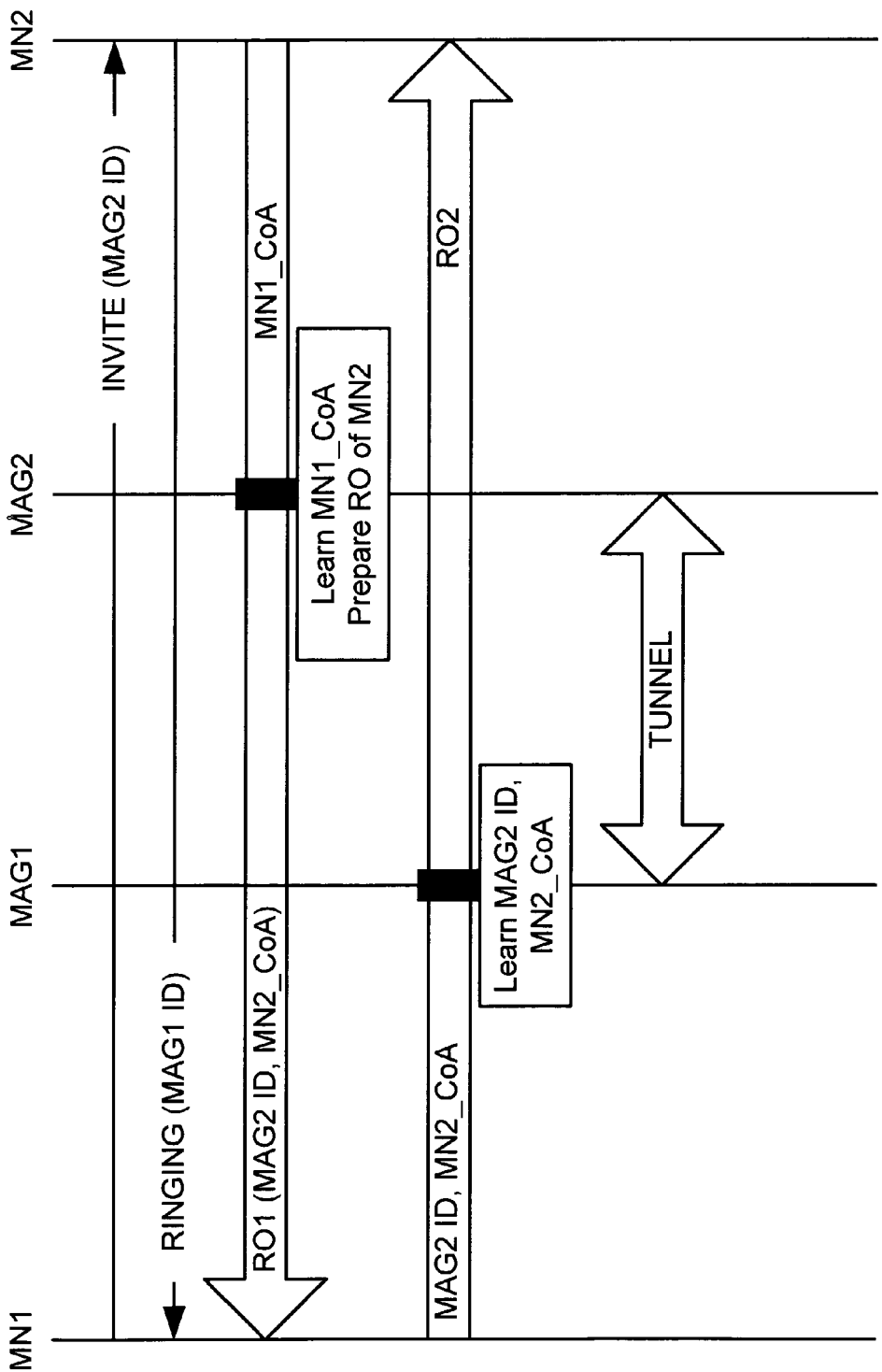
FIG. 18 is a signaling diagram showing yet another embodiment of the invention, for establishing a tunnel between the MAGs.

In this embodiment, MAG1 is adapted so as to intercept the CoTi message from MN1, similarly to MAG2. According to the exemplary procedures illustrated in FIG. 18, it is possible to provide MAGs with information allowing a packet in the communication session of MNs to be directly transmitted between MAGs. FIG. 18 shows an exemplary sequence in the procedures of this embodiment of the invention. As apparent from FIG. 18, after exchanging the Invite and Ringing message, MN2 is the entity that first initiates a RO procedure. Nevertheless, this is just as an example, since either MN1 or MN2 can first carry out a RO procedure.

As similar to the procedures of the above-mentioned embodiment illustrated FIG. 8, MN1 and MN2 are attached to MAG1 and MAG2 respectively in FIG. 18. MN1 and MN2 obtain MAG1-ID and MAG2-ID respectively by using an arbitrary method. For example an arbitrary method could be the SIP signaling that takes place in the connection establishment phase or the AAA signaling for authentication and authorization during the network attachment procedure. Analogically an arbitrary trigger can be a message caused by the arbitrary method. Further the MN2 learns the MN1 identity during the connection establishment phase using the SIP INVITE message. This message contains the MN1 identity that is usually the MN1 HoA. However, for the purpose of the current embodiment, it is assumed that the MN2 learns in addition the MN1 CoA through an arbitrary method. One possible way is the use of SIP signaling. For example the MN1 can include its CoA in the INVITE message that is sent to the SIP Proxy Server (SIPpr1) as described above. The SIPpr1 forwards the information of the MN1 CoA further along the MN2. In a similar way the MN1 can learn the MN2 CoA by an arbitrary method, depending on which entity first initiates a RO procedure.

When MN2 starts the RO procedures in response to an arbitrary trigger, MN2 inserts MN2_CoA and MAG2-ID in an arbitrary message to be transmitted in the course of the RO procedures. In this way, MN1 obtains information on MN2 (the relation between MAG2-ID and MN2_CoA). Moreover, MN2 inserts information on MN1 (for instance, MN1_CoA) into an arbitrary message (for instance, a message addressed to MN1) in the course of the RO procedures in the format so that MAG2 can detect.

MAG2 intercepts this message, and learns information on MN1 (for instance, MN1_CoA). And then, MAG2 starts the preparation for the RO procedures to be performed for MN2. As this preparation for the RO procedures, MAG2 may obtain (or collect) identification information of MAG (that is, MAG1-ID of MAG1) which attaches to MN (that is, MN1) identified by MN1_CoA, or perform advance preparation for establishing the PMIP RO tunnel between MAG2 and MAG1 which attaches to MN1.

On the other hand, MN1 starts RO (RO2) at a direction from MN1 toward MN2. MN1 inserts information on MN2 (MN2_CoA and MAG2-ID) into an arbitrary message transmitted in the course of the RO procedures in the format so that MAG1 can detect. In this way, MAG1 intercepts this message, and learns information on MN2 (the relation between MN2_CoA and MAG2-ID).

According to the above operation, MAG1 can learn information on MN2 (the relation between MN2_CoA and MAG2-ID). Furthermore, MAG2 can learn information on MN1 (for instance, the relation about MN1_CoA), and start preparing for establishing the PMIP RO tunnel for MN2 (preparation about authentication procedures or other various setting procedures) at an early stage (early compared to the above-mentioned embodiments). As a result, the tunnel can be established between MAG1 and MAG2 for a data packet of a communication session between MN1 and MN2 to be directly forwarded. The data path of the communication session between MN1 and MN2 becomes shorter when the packet is forwarded via this tunnel.

In the following, an example of the detailed operation of this embodiment will be described with reference to FIG. 19. FIG. 19 shows an example of the detailed sequence in the procedures of this embodiment of the invention. In FIG. 19, the detailed operation is described based on the network configuration illustrated in FIG. 7. The detailed operation illustrated in FIG. 19 differs from the operation of FIG. 18 in that it begins with a RO from MN1, unlike in FIG. 18 where MN2 begins with a RO procedure.

In FIG. 19, the bold black lines (between MN1 and HA1, and between MN2 and HA2) denote the MIPv6 tunnel, and the bold gray lines (between MAG1 and LMA1, and between MAG2 and LMA2) denote the PMIPv6 tunnel. Moreover, the text in bold italic font denotes new information or a new process.

In the beginning, the data packets would be transmitted over MIP and PMIP tunnels via home networks. MN1 and MN2 learn identification information of MAG respectively (that is, MN learns identification information of MAG which the MN is attached to) by an arbitrary method, such as the above-mentioned SIP method or from advertised information by MAG which the MN is attached to when connecting. That is to say, MN1 learns MAG1-ID, and MN2 learns MAG2-ID.

MN1 starts the MIPv6 RO procedures in response to an arbitrary trigger (for instance, the trigger in the received SIP ringing message), and it sends HoTi and CoTi messages to MN2. The HoTi message from MN1 to MN2 and the HoT message from MN2 to MN1 are similar to the standard HoTi and HoT messages, respectively. The path of the HoTi message from MN1 to MN2 and the path of the HoT message from MN2 to MN1 are the same, and the HoTi/HoT messages are shown by a bi-directional arrow in FIG. 19.

On the other hand, as for the CoTi message, MN1 sends the extended CoTi message with additional information (for instance, additional information is added to the extended field in this message) to MN2. It is preferable that additional information would be information indicating MN2, such as the address (MN2_CoA or MN2_HoA) of MN2 which is a correspondent node for MN1. In previous embodiments there was an assumption that the destination IP address of the CoTi message is the MN2 HoA. In this embodiment it is possible that the CoTi's destination IP address may be the MN2 CoA. It might be also possible that MAG1 reads MN2_CoA (or MN2_HoA) from the destination IP address of the CoTi message. In this case, MN2_CoA (or MN2_HoA) need not to be added as the special additional information. In addition, MN1 may add information that explicitly shows whether or not MN1 desires the PMIP RO tunnel establishment between MAGs (forwarding the data packets of the communication session with MN2 via this RO tunnel) as the additional information. This allows MAG1 to readily determine whether or not it should perform subsequent processes for tunnel establishment even in case of extracting MN1's address and MN2's address from the standard CoTi message. When MN1 sends the extended CoTi message, this message itself may show that MN1 desires the PMIP RO tunnel establishment between MAGs. In FIG. 19, the destination address of the CoTi message is MN2_HoA (tunnelled by HA2). FIG. 19 shows the case where MN2_CoA is informed by the extended CoTi message.

MAG1 detects (sniffs) the extended CoTi message sent by MN1. MAG1 extracts the additional information (for instance, MN2_CoA) from this message, and starts preparation for the PMIP RO procedures for MN1. For instance, MAG1 memorizes that MN1 sends and receives some information for the purpose of MIP RO, for example in a memory area for managing the packet forwarding routes. Furthermore, as for the communication session between MN1 and MN2, MAG1 starts preparation for the processes which will be performed when receiving a message for RO from MN2 (or from MAG which MN2 is attached to).

As the preparation for the PMIP RO procedures for MN1, MAG1 can perform, but not limited to, the process for saving the forwarding table for forwarding the data packet addressed to MN2_CoA from MN1 to MAG which MN2 is attached to (however, MAG1 cannot learn the accurate destination at this stage), the process for requesting an authentication server to provide information which should be sent to MAG2 (such as, necessary information for authentication), the process for preparing to readily accept when receiving authentication information from MAG2, the process for setting the tunnel interface used for the PMIP RO tunnel between MAGs, or the process for reserving the necessary resources for QoS (Quality of Service).

As for the above process for preparing to readily accept when receiving authentication information from MAG2, MAG1 may add keying information to the extended CoTi message sent by MN1 so that MAG2 can extract and use authentication information including this keying information. This enables MAG1 to readily identify and authenticate that MAG2 is identical to MAG of MN2 which is a correspondent node for MN1.

Moreover, MAG1 may remove the additional information from the extended CoTi message sent by MN1, and then forward this message in the standard CoTi message format. MAG1 may forward the extended CoTi message with the additional information (or with further additional information added). The extended CoTi message sent by MN1 is part of RR procedures, and MN2 responds this extended CoTi message with a CoT message.

After the RR procedures have been completed successfully, MN1 sends the extended BU message (the extended registration message) with the learned MAG1-ID. For instance, the learned MAG1-ID is added in an extended field in this message. Upon receiving this extended BU message, MN2 creates a BCE storing the relation between MN1_HoA and MN1_CoA and extends the BCE with MAG1-ID.

On the other hand, MN2 also starts the RR procedures (the exchange of the HoTi/HoT messages and CoTi/CoT messages). At this time, MN2 sends the extended CoTi message having the MN1_CoA as the destination IP address and additionally including the MAG1-ID learned from the previously received extended BU message. MAG2 detects (sniffs) the extended CoTi message sent by MN2. Upon detecting the extended CoTi message, MAG2 extracts the relation between MN1_CoA and MAG1-ID.

MAG2 may remove the additional information (for example the MAG1-ID) from the extended CoTi message, and then forward this message (as a standard CoTi message) to MN1. MAG2 may forward this extended CoTi message to MN1 without modification. The subsequent processes will be the same as those of the standard MIPv6 RR procedures (also the process for sending BU message).

Upon learning the relation between MN1_CoA and MAG1-ID (that is, upon extracting the relation between MN1_CoA and MAG1-ID from the extended CoTi message), MAG2 can start establishing the PMIP RO tunnel with MAG1 immediately.

MAG2 may perform its own processes necessary for the PMIP RO between MAGs, and send necessary information (such as, authentication information, information for the tunnel establishment procedures or information for QoS reservation procedures) for the PMIP RO procedures to MAG1 (identified by MAG1-ID). Such an information exchange can be performed in parallel with the MIP RO procedures by MN2. Thus, the processes necessary for the PMIP RO tunnel establishment can begin earlier.

Since MAG1 can be ready for accepting the PMIP RO procedures offered by MAG (MAG2) which attaches to the correspondent node of MN1, MAG1 can perform the PMIP RO procedures promptly (or, part of authentication procedures such as a query process can be performed).

It is highly possible that the PMIP RO tunnel has been already established between MAG1 and MAG2 when MIP RO is completed between MN1 and MN2. In this case, the data path via the optimized route by both MIP and PMIP can be available immediately.

The method of determining that MAG1 and MAG2 can actually forward the data packet via the PMIP RO tunnel between MAGs may be, but not limited to, a method of confirming by intercepting the BA message sent by MN1 as illustrated in FIG. 19. MAG1 and MAG2 may start forwarding based on the created forwarding tables when they can detect a data packet addressed MN2_CoA from MN1 or a data packet addressed to MN1_CoA from MN2. Alternately, MN1 and/or MN2 may inform MAGs that the MIP RO procedures have been completed. Furthermore, one MAG may tell the initiation of forwarding to another MAG.

The extended CoTi message sent by MN1 may also serve as the message for inquiring of MAG1 for its identification information (MAG1-ID). In this case, MAG1 informs MN1 about MAG1-ID. Thus, MN1 can learn MAG1-ID at this stage even if MN1 has not learned MAG1-ID in advance (for instance, through the SIP procedures).

Moreover, the extended CoTi message sent by MN1 may also serve as the message for requesting to inform the MAG1-ID from MAG1 to MN2. In this case, MAG1 adds its own identification information (MAG1-ID) to the extended CoTi message or informs MN2 about its own ID (MAG1-ID) by using another message. Thus, MAG1-ID need not be added to the BU message from MN1 to MN2.

Moreover, the extended CoTi message sent by MN1 may also serve as the message for informing MN2 about MAG1-ID (however, MN1 should learn identification information of MAG1 before sending this message). In this case, the process for adding MAG1-ID to the BU message sent from MN1 to MN2 can be omitted. If MN1 has already received identification information (MAG2-ID) of MAG2 which attaches to MN2, MN1 can add the relation between MN2_CoA and MAG2-ID to the BU message, by which the above relation can be informed to MAG1 at an earlier stage.

If each of MN1 and MN2 could learn identification information of other party's MAG (MAG2-ID for MN1 and MAG1-ID for MN2) through the SIP procedures performed in advance, or by obtaining from the advertised information by MAG when connecting, etc., MN1 may add information about the relation between MN2_CoA and MAG2-ID to the extended CoTi message, and MN2 may add information about the relation between MN1_CoA and MAG1-ID to the extended CoTi message. According to the method of informing identification information of MAG which MN is attached to when sending the extended CoTi message, information about MAG of a correspondent node can be informed by the extended CoTi message (this information is informed by the extended BU message in FIG. 13 according to the above-mentioned embodiment). Furthermore, in case that both MNs have started the MIPv6 RO almost simultaneously, each MN has already sent the valid CoTi message at the time each MN receives the extended BU message. In this case, it may not be necessary for each MN to send the additional message so that it reaches each MAG (such as the retransmitted CoTi message in the above-mentioned embodiment illustrated in FIG. 13). In some cases, some additional messages might be sent in this embodiment. However, it is likely that PMIP RO would begin early compared to the above-mentioned embodiment.

Considering a general environment where MAGs and MNs with new functions are located in both networks, operations in both networks would be symmetric. According to the principle about this embodiment, this symmetry can be efficiently utilized. In other words, MAG can detect whether the CoTi message is extended or not only by intercepting the CoTi message (the process of intercepting would be an additional action, compared to just forwarding messages). Thus, it is likely that MAG1 and MAG2 intercept both the CoTi message sent first by MN1 and the CoTi message sent later by MN2, in case that both MAG1 and MAG2 implement functions of this invention. Therefore, it is not that the processing load of intercepting by MAG in this embodiment (the operation illustrated in FIG. 19) increases as compared to the above-mentioned embodiment (for instance, the operation illustrated in FIG. 13). According to this embodiment (the operation illustrated in FIG. 19), the process of intercepting by MAG1 can be actively utilized.

The process of intercepting by MAG1 can be actively utilized, also in case that the extended BU message is used for informing MAG1 about MN2's address, for requesting preparation for the PMIP RO with MAG1, and for informing MN2 about the relation between MN1 and MAG1. In this case, the message intercepted by each MAG would be the BU message (or the extended BU message).

In addition, the extended message such as the extended CoTi message and the extended BU message, may have, but not limited to, an optional field (extended field) to include necessary information for this invention.

The embodiment described in FIG. 18 and FIG. 19 has the advantage that the PMIP RO tunnel between MAG1 and MAG2 may be established before the MIPv6 RO/RR procedures between MN1 and MN2 are completed. Thus, immediately after the MIPv6 RO/RR procedures are completed the data packets start flowing over the PMIP RO tunnel. On the other hand the disadvantage is that the PMIP RO tunnel is set up even if the MIPv6 RO procedure is not successful, i.e. the PMIP RO tunnel is not needed.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technological Background section. Furthermore the concept of the invention may be also readily used in the LTE RAN currently discussed by the 3GGP.

The invention claimed is:

1. A method for informing a first access gateway, attaching a mobile node to a first network, about the identity of a second access gateway, attaching a correspondent node to a second network, comprising the steps of:
   informing the correspondent node about the identity of the second access gateway, by using messages for a session initiation between the mobile node and the correspondent node, the informing of the correspondent node about the identity of the second access gateway by using messages for the session initiation not being provided directly by the mobile node to the correspondent node,
   informing the mobile node about the identity of the second access gateway using messages of a first route optimization procedure initiated by the correspondent node with the mobile node, the informing of the mobile node about the identity of the second access gateway using messages of the first route optimization procedure not being provided directly by the correspondent node to the mobile node,
   and
   extracting by the first access gateway the identity of the second access gateway from a message, comprising the identity of the second access gateway, transmitted from the mobile node to the correspondent node.

2. The method according to claim 1, further comprising the steps of:
   informing the mobile node about the identity of the first access gateway, by using messages for the session initiation between the mobile node and the correspondent node, the informing of the mobile node about the identity of the first access gateway by using messages for the session initiation not being provided directly by the correspondent node to the mobile node,
   informing the correspondent node about the identity of the first access gateway by using messages of a second route optimization procedure initiated by the mobile node with the correspondent node, the informing of the correspondent node about the identity of the first access gateway by using messages of the second route optimization procedure not being provided directly by the mobile node to the correspondent node, and
   extracting by the second access gateway the identity of the first access gateway from another message, comprising the identity of the first access gateway, transmitted from the correspondent node to the mobile node.

3. The method according to claim 2, wherein the message, comprising the identity of the second access gateway, transmitted from the mobile node to the correspondent node, is part of the second route optimization procedure.

4. The method according to claim 1, further comprising the step of:
   establishing a data path between the first and the second access gateway by routing in the second/first access gateway data packets destined to the mobile/correspondent node to the first/second access gateway using the extracted identities of the first and second access gateway.

5. The method according to claim 4, wherein the step of establishing a data path between the first and second access gateway comprises performing a route optimization procedure between the first and second access gateway.

6. The method according to claim 4, wherein after the first route optimization, initiated by the correspondent node, the mobile node is informed about the location-dependent address of the correspondent node, and wherein the step of extracting by the first access gateway the identity of the second access gateway also extracts the location-dependent address of the correspondent node, and wherein the step of establishing the data path between the first and second access gateway comprises generating in the first access gateway a first routing entry for data packets, associating the location-dependent address of the correspondent node with an address of the second access gateway.

7. The method according to claim 6, wherein after the second route optimization initiated by the mobile node, the second mobile is informed about the location-dependent address of the mobile node, and wherein the step of extracting by the second access gateway the identity of the first access gateway also extracts the location-dependent address of the mobile node, and wherein the step of establishing the data path between the first and second access gateway comprises generating in the second access gateway a second routing entry for data packets, associating the location-dependent address of the mobile node with an address of the first access gateway.

8. A communication method, comprising the steps of:
attaching a mobile node to a first network via a first access gateway,
attaching a correspondent node to a second network via a second access gateway,
informing a first administration server of the mobile node about the identity of the second access gateway by using messages for a session initiation between the mobile node and the correspondent node, and
informing by the first administration server the first access gateway about the identity of the second access gateway.

9. The method according to claim 8, further comprising the steps of:
informing a second administration server of the correspondent node about the identity of the first access gateway by using messages for the session initiation between the mobile node and the correspondent node,
informing by the second administration server the second access gateway about the identity of the second access gateway.

10. The method according to claim 9, further comprising the steps of:
informing by the first administration server the first access gateway about a location-dependent address of the correspondent node,
generating in the first access gateway a first routing entry for data packets, associating the location-dependent address of the correspondent node with an address of the second access gateway,
informing by the second administration server the second access gateway about a location-dependent address of the correspondent node,
generating in the second access gateway a second routing entry for data packets, associating the location-dependent address of the correspondent node with an address of the second access gateway.

11. The method according to claim 9, further comprising the steps of:
initiating and performing by the mobile node a first route optimization procedure with the correspondent node, and
initiating and performing by the correspondent node a second route optimization procedure with the mobile node.

* * * * *